(12) United States Patent
Kawasaki

(10) Patent No.: US 6,519,084 B1
(45) Date of Patent: Feb. 11, 2003

(54) TELESCOPE AND MOVEMENT CONTROL DEVICE

(75) Inventor: Shuichi Kawasaki, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/763,022

(22) PCT Filed: Mar. 8, 2000

(86) PCT No.: PCT/JP00/01395

§ 371 (c)(1),
(2), (4) Date: Feb. 15, 2001

(87) PCT Pub. No.: WO00/54088

PCT Pub. Date: Sep. 14, 2000

(30) Foreign Application Priority Data

| Mar. 10, 1999 | (JP) | 11/063449 |
| Mar. 10, 1999 | (JP) | 11/063450 |
| Aug. 25, 1999 | (JP) | 11/238300 |

(51) Int. Cl.$^7$ ............... G02B 23/00; G02B 5/02
(52) U.S. Cl. ............ 359/430; 359/399; 359/225; 359/849; 359/871
(58) Field of Search ............ 359/399, 430, 359/429, 223–226, 846–849, 821–879

(56) References Cited

U.S. PATENT DOCUMENTS

| 2,981,572 A | * | 4/1961 | Kuhne | 359/430 |
| 3,502,387 A | * | 3/1970 | Hadley | 359/399 |
| 3,603,664 A | * | 9/1971 | James | 359/430 |
| 3,942,865 A | * | 3/1976 | Rand | 359/430 |
| 4,583,829 A | * | 4/1986 | Meier | 359/847 |
| 5,115,351 A | * | 5/1992 | Miyawaki et al. | 359/849 |
| 5,131,611 A | | 7/1992 | Vollaro | 244/158 R |
| 5,822,116 A | * | 10/1998 | Leblanc | 359/430 |

FOREIGN PATENT DOCUMENTS

| EP | 0682126 A1 | 11/1995 |
| JP | 7-281102 | 10/1995 |
| JP | 8-92767 | 4/1996 |

* cited by examiner

Primary Examiner—Thong Nguyen
(74) Attorney, Agent, or Firm—Wenderoth, Lind & Ponack, L.L.P.

(57) ABSTRACT

A telescope is constructed so that inertia force caused when the telescope is moved is canceled to thereby eliminate any influence on a space station, artificial satellite or the like. When a telescope body (1) rotates around an axis (X) in a direction ($\alpha 1$), counter weights (6a, 6b) are driven by a rotator drive (10) so as to rotate in a direction ($\alpha 2$) which is reverse to the direction ($\alpha 1$), so that the inertia force caused is canceled. Also, when the telescope body (1) rotates around an axis (Y) in a direction ($\beta 1$), counter weights 8a, 8b are rotated in a direction ($\beta 2$), which is reverse to the direction ($\beta 1$) so that the inertia force caused is canceled.

13 Claims, 18 Drawing Sheets

TELESCOPE AND MOVEMENT CONTROL DEVICE

BACKGROUND OF THE INVENTION

1. Field of the Invention

The present invention relates to a device, such as a telescope or antenna, which needs a directional control for tracking purposes. The device is weighty itself and installed on a structure, such as that installed in space, on board ship or on land, located in a place where reaction force or inertia force is unfavorable. In particular, when a telescope, for example, is installed on a space station or artificial satellite, if the telescope is moved, a large inertia force arises to act on the space station so that an attitude control of the station itself is badly affected. Hence, a telescope structured so as to cause no such inertia force and to be operated accurately in space, on board ship or on land, is provided.

2. Background of the Invention

When a large conventional astronomical telescope, such as the Hubble space telescope, is directed to an object to be observed, it is moved in its entirety, which requires a large amount of energy. In particular, in the case of a telescope to be operated in space, although not illustrated, a reflecting telescope is assembled in a satellite unit and this satellite unit itself must be attitude-controlled so as to direct the telescope to the object to be observed. Such attitude control of the telescope is done by performing an attitude control of a satellite unit mounted with a CMG (Control Moment Gyro) or by performing a position control of a satellite unit by gas jetting. Thus, only for moving the space telescope, a large amount of energy is needed. Also, when a telescope installed on a space station is operated, a large inertia force arises, which is not allowable in the space station. Hence, a structure that causes no such inertia force, even when the telescope is moved to be directed to an object, has long been desired. Further, when the device, such as an antenna or the like, is to be directed to an object, reaction force by the CMG or the like is used like in the case of the telescope.

In the prior art space telescope, as mentioned above, the telescope is assembled in the satellite and when the telescope is to be directed to an object, the satellite unit itself is attitude-controlled. In order to move the telescope, therefore, a large scale structure and a large amount of energy are required. Hence, development of a telescope having a structure that is simple and yet accurately attitude-controllable has been desired. Also, when the telescope installed on a space station is operated, a large inertia force arises to act on the space station to thereby cause a large problem on the attitude control of the space station itself. But, occurrence of such inertia force is not allowable in the space station, so that development of a telescope which is to be used on a space station and yet has a structure that causes no such inertia force has been likewise desired.

FIG. 20 is a constructional view of a large astronomical reflecting telescope in the prior art. In FIG. 20, numeral 221 designates a telescope body. A concave mirror 222 is provided in a lower part of the telescope body 221 and a condenser 223 is provided in an upper central part of same. In a central part of the concave mirror 222, a hole 225 passes therethrough. A camera or an ocular 224 is provided right below the hole 225.

In the astronomical telescope constructed as described above, light rays 230 coming from space enters the telescope body 221 through its upper portion and is reflected by the concave mirror 222, like numeral 230a, then is converged by the condenser 223, like numeral 230b. The light converged by the condenser 223 passes through the hole 225 provided in the central part of the concave mirror 222 and converges on the camera 224 to be taken as an image. In the reflecting telescope so constructed, the light 230 entering the upper portion of the telescope body 221 is partially blocked by the condenser 223 provided in the central portion of the telescope body 221. Therefore, the light coming to the concave mirror 222 is reduced in quantity, and the converging ability as a whole is lowered. Thus, an improvement to take a further accurate image has also been desired.

SUMMARY OF THE INVENTION

In view of the problems in the prior art, the present invention has the following objects:

To provide a telescope having a structure that cancels the inertia force generated when the telescope is moved to be directed to an object so that the telescope is usable in space without the occurrence of inertia force even if the telescope is installed on a space station.

To provide an equipment movement control device having a simple structure by which equipment, such as a telescope or antenna, is moved to be directed to an object and yet is moved accurately in a given direction.

To provide an astronomical reflecting telescope having a condenser structure in which a condenser is arranged so that entering light is not blocked by the condenser to thereby enhance a whole converging ability.

In order to attain the objects mentioned above, the present invention provides the following embodiments:

A telescope comprises a telescope body an d a reflecting mirror, a condenser and a camera or ocular contained in the telescope body. A counter weight moves rotationally at the same time that the telescope body is moved rotationally to be directed to an observed object so that inertia force caused by the rotational movement of the telescope body may be canceled.

A telescope comprises a telescope body and a reflecting mirror, a condenser and a camera or ocular contained in the telescope body. The reflecting mirror, condenser and camera or ocular are connected integrally to one another so that the reflecting mirror is movable together with the condenser and camera or ocular to be directed to an observation object.

A telescope comprises a telescope body and a reflecting mirror, a condenser and a camera or ocular contained in the telescope body. The reflecting mirror and a unit of the condenser and camera or ocular are movable independently of each other.

A telescope as mentioned above, in which a plurality of counter weights are fitted to a circumferential periphery of a bottom portion of the reflecting mirror.

A telescope as mentioned above, in which a plurality of counter weights are fitted to a circumferential periphery of a base portion to which the reflecting mirror is fitted.

A telescope as mentioned above, in which a counter weight is provided between the reflecting mirror and a base portion to which the reflecting mirror is fitted so that a bottom surface of the reflecting mirror and the base portion are connected to each other and the counter weight is movable in a direction reverse to a movement of the reflecting mirror.

A telescope as mentioned above, in which each of the counter weights is fitted via an actuator.

A telescope as mentioned above, in which a plurality of horizontal component counter weights are arranged on an upper surface of the base portion.

A first telescope as mentioned above, in which the counter weight comprises a counter weight for canceling the inertia force caused when an end of the telescope body inclines toward the observation object to move up and down rotationally, and a counter weight for canceling the inertia force caused when the telescope body, so inclining, rotates around an axis orthogonal to a base portion to which the telescope body is fitted.

A telescope as mentioned above, in which the counter weight for canceling the inertia force caused when the end of the telescope body moves up and down rotationally is fitted to an end of an arm, and the arm is rotatable.

If the telescope is rotated to be directed to an observation object, such as a star, a large inertia force occurs. In particular, when the telescope is installed on a space station, this inertia force acts on the station side to seriously influence the microgravity environment. Hence, occurrence of such inertia force is not allowable. In the invention above, such inertia force is canceled by the reverse directional force caused by the counter weight and, hence, the telescope of the present invention is well applicable to the space station. Also, as mentioned in the invention above, the counter weight comprises two types to cancel the inertia force caused by the upward and downward rotational movement of the end of the telescope and to cancel the inertia force caused by the rotation of the telescope body around the axis orthogonal to the base portion. Hence, the inertia forces so caused can be canceled effectively.

In the second invention above, the reflecting mirror, condenser and camera or ocular are constructed to be moved integrally for tracking stars, etc. In the third invention above, the reflecting mirror and the unit of the condenser and camera or ocular are constructed to be moved independently of each other. Whichever of these two constructions is employed, there is no need to move the entire telescope body for tracking the observed object and, hence, the movable portions can be reduced.

In the fourth and fifth inventions above, the plurality of counterweights are fitted so as to cancel the inertia force which occurs corresponding to the movement of the reflecting mirror. In addition to the effect of the second and third inventions above to reduce the movable portions, the inertia force of such movable portion can also be canceled. Further, as mentioned in the sixth and seventh inventions above, the fitting art of the counter weight is uniquely devised so as to enlarge the application range, and in the eighth invention above, the horizontal component counter weights are added and thereby the inertia force can be canceled securely.

Also, in order to attain the second object mentioned in above, the present invention provides the following embodiments:

An equipment movement control device moves an equipment body to be directed to an object. The equipment body has its bottom surface formed in a curved shape. An equipment body basement supports a bottom portion of the equipment body and has its bottom surface made of a magnetic substance and formed in a curved shape complementary to the curved shape of the bottom surface of the equipment body. A base stand has its upper surface formed in a curved shape complementary to the curved shape of the bottom surface of the equipment body basement so that the bottom surface of the equipment body basement may abut on the upper surface of the base stand levitatably therefrom. A plurality of stationary side coils are arranged on an entire portion of the upper surface of the base stand, and a plurality of moving purpose coils are arranged in radial directions extending from a center of the upper surface of the base stand. A control means excites the stationary side coils and moving purpose coils so as to levitate the equipment body basement from the base stand and so as to control a movement of the equipment body basement.

An equipment movement control device as mentioned above, in which the equipment body is a telescope body that comprises a reflecting mirror formed in a curved shape on a bottom surface of the telescope body, a condenser arranged in an upper portion of the telescope body and a camera or ocular supported right below the condenser. Alternatively, the equipment body is an antenna body that comprises an antenna erected at a central portion of the antenna body and has its bottom surface formed in a curved shape.

An equipment movement control device as mentioned above, in which the base stand has a space formed therein having a curved shape complementary to the curved shape of the upper surface of the base stand and having a constant height of the space. A counter weight, having its bottom surface made of a magnetic substance, is placed movably in the space. A plurality of stationary side coils are arranged on an entire portion of a bottom surface of the space. A plurality of moving purpose coils are arranged in radial directions extending from a center of the bottom surface of the space. The control means controls excitement of the stationary side coils and moving purpose coils so that both of the coils may be excited simultaneously to thereby levitate the counter weight from the bottom surface of the space and to move the counter weight to a direction reverse to the movement of the equipment body basement.

The first invention above is applicable to the equipment movement control device and the second invention above is applicable to the telescope or antenna movement control device. In both the inventions, once the control means excites the stationary side coils arranged on the upper surface of the base stand, the equipment body is magnetically levitated from the upper surface of the base stand by the repulsive force between the magnetic substance of the equipment body basement and the stationary side coils. Then, the control means excites the moving purpose coils arranged at the location to which the equipment body is to be moved out of the plurality of the moving purpose coils and the equipment body, while being levitated, is easily moved to the desired location by the attractive force between the magnetic substance of the bottom surface of the equipment body basement and the moving purpose coils so excited. When the equipment body moves to the desired location, the control means releases the excitement of the stationary side coils and thereby the equipment body basement abuts on the upper surface of the base stand to be fixed there. Thus, the observed object can be observed at the position so set.

In the third invention above, at the same time when the equipment body moves as mentioned above, the counter weight is moved in the direction reverse to the moving direction of the equipment body and thereby the inertia force caused by the movement of the equipment body is canceled. That is, the control means excites the stationary side coils of the bottom surface of the space of the base stand to thereby levitate the counter weight from the bottom surface of the space by the repulsive force between the magnetic substance of the counter weight and the stationary side coils. At the same time, the control means excites the moving purpose coils of the bottom surface of the space arranged at the location opposite to the location to which the equipment body is to be moved to thereby move the counter weight reversely to the equipment body by the attractive force. Thus, the inertia force caused can be canceled.

When the telescope is moved rotationally to be directed to an observed object, such as a star, or the antenna is moved, then a large inertia force arises. In particular, if the telescope or antenna is installed on a space station, this inertia force adds to the station side to seriously influence the microgravity environment and, hence, occurrence of such inertia force is not allowable. According to the third invention, such inertia force is canceled by the force of the counter weight acting in the reverse direction, and the mentioned equipment movement control device can be applied to the space station as well.

Further, in order to attain the object mentioned above, the present invention includes the following embodiment:

A reflecting telescope comprises a telescope body of a cylindrical shape, a concave mirror arrangement on a bottom surface of the telescope body, a condenser arranged above the concave mirror and a camera or ocular arranged below the condenser. Light entering an upper portion of the telescope body is reflected by the concave mirror to be converged on the condenser and then the camera or ocular. The concave mirror is made so as to make an angle of the light so reflected adjustable by an actuator. An opening portion is for med in a middle portion of a side wall of the telescope body, and the condenser is located outside of the opening portion so that a full quantity of the light entering the upper portion of the telescope body may be reflected by the concave mirror and received by the condenser through the opening portion. The camera or ocular is located near the opening portion so as to receive the light coming from the condenser.

A reflecting telescope as mentioned above, in which the angle of the light reflected by the concave mirror is predetermined and the concave mirror is fixed to the bottom surface of the telescope body so as to reflect the light with the predetermined angle.

A reflecting telescope as mentioned above, in which a surface shape of the concave mirror is set to such a shape as to minimize an optical path difference with the condenser and a concave surface shape of the condenser is set arbitrarily.

In the reflecting telescope of the first and second inventions above, the condenser is provided outside of the opening portion which is formed in the middle portion of the side wall of the telescope body. Thus, the light entering the upper portion of the telescope body is not blocked by the condenser and the full quantity of the light entering is reflected by the concave mirror. The angle of the reflected light is adjusted by the concave mirror being moved by driving the actuator, and the angle is so set that the full quantity of the reflected light passes through the opening portion to be received by the condenser. Thus, the full quantity of light entering the upper portion of the telescope body is reflected by the concave mirror and received by the condenser to be further received by the camera or ocular right below the condenser, so that there is no reduction in the light converging ability.

In the second invention above, the angle of the light reflected by the concave mirror is adjusted to be predetermined so that the full quantity of reflected light may pass through the opening portion of the side wall of the telescope body, and the concave mirror is fixed to the bottom surface of the telescope body so as to reflect the light with the angle so predetermined. Hence, when the telescope is directed correctly at the observed object, the fill quantity of light entering the upper portion of the telescope body can be received by the condenser. Thus the actuator can be eliminated and the work for the adjustment of the concave mirror can be saved.

BRIEF DESCRIPTION OF THE DRAWINGS

FIG. 4 is a constructional view of a space telescope of a fourth embodiment according to the present invention, wherein

FIG. 5 is a detailed view of a reflecting mirror portion of the telescope of FIG. 4, wherein

FIG. 6 is a view showing one variation of a counter weight of the telescope of FIG. 4, wherein FIG. 6(a) is a side view and FIG. 6(b) is a plan view.

FIG. 8 is an explanatory view of operation examples of the counter weight of FIG. 5, wherein FIG. 8(a) is an example using a pulley and FIG. 8(b) is an example using an actuator.

FIG. 9 is an explanatory view of application examples of the counter weight of FIG. 8 which are added with horizontal component counter weights, wherein FIG. 9(a) is an example using a rope and FIG. 9(b) is an example using an actuator.

FIG. 10 is a constructional view of a space telescope of a fifth embodiment according to the present invention, wherein

FIG. 14 is a view explaining functions of a telescope of the sixth embodiment of FIG. 11, wherein

DETAILED DESCRIPTION OF THE INVENTION

Herebelow, embodiments according to the present invention will be described concretely with reference to figures.

Figure 1:
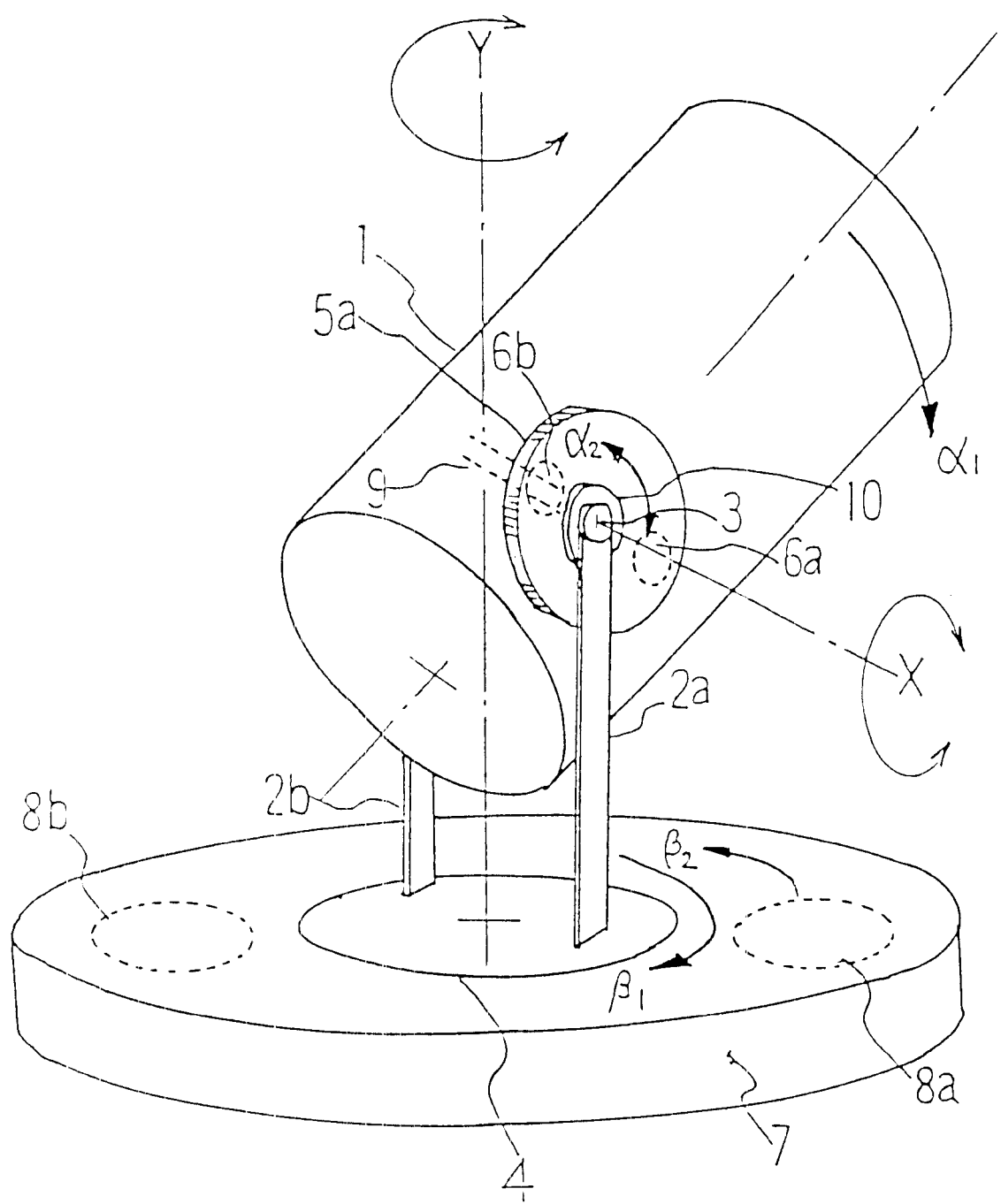
FIG. 1 is a perspective constructional view of a space telescope of a first embodiment according to the present invention.

FIG. 1 is a perspective constructional view of a space telescope of a first embodiment according to the present invention. There, numeral 1 designates a telescope body having a cylindrical shape, in which a reflecting mirror, a condenser, a camera and the like are provided, although not illustrated. Numerals 2a, 2b designate telescope body supports, respectively. Each of the telescope body supports 2a, 2b has a first end provided with a shaft 3 for supporting the telescope body 1 rotatably around the shaft 3, and has a second end fixed to a base 4 for supporting the telescope body 1 on the basement 4.

A shaft 9 has both ends fixed with first and second counter weight units 5a, 5b (illustration of the unit 5b being omitted) and the counter weight units 5a, 5b together with the shaft 9 are supported rotatably by the shaft 3 on both sides of the telescope body 1. Each of the counter weight units 5a, 5b comprises therein an arbitrary number of sets of counter weights 6a, 6b arranged circumferentially and oppositely to each other. Also, around the base 4, there is provided rotatably a third counter weight unit 7 having a doughnut shape. The counter weight unit 7 comprises therein an arbitrary number of sets of counter weights 8a, 8b arranged circumferentially and oppositely to each other, so that the counter weight unit 7 together with the counter weights 8a, 8b can rotate around the basement 4. Numeral 10 designates a rotator drive for controlling rotation of the counter weights 6a, 6b.

The telescope constructed as mentioned above is rotatable around a vertical axis Y along a central axis of the base 4 and around a horizontal axis X along a central axis of the shaft 3, so as to change its attitude toward an object in space. When the telescope body 1, having a heavier front, or distal, end and a lighter rear, or proximal, end, is moved around the axis X and axis Y so as to be directed to the object, it sways at the front end to cause a large inertia force. This inertia force acts on the space station on which the telescope is installed to largely influence the attitude of the space station. Hence, such inertia force must be avoided.

In the present first embodiment, when the telescope body 1 is rotated around the axis X, in a direction 1 as shown in FIG. 1 for example, the rotator drive 10 at the same time rotates the counter weights 6a, 6b rapidly in a direction 2, which is opposite the direction 1, so that the inertia force generated is canceled. Because the counter weights 6a, 6b are provided in an arbitrary number of sets arranged circumferentially and opposite to each other, as mentioned above, when they are rotated at a high speed opposite the direction in which the telescope body 1 is rotated, a force acting in the direction to cancel the inertia force of the telescope body 1 can be obtained.

The magnitude of the inertia force can be adjusted by rotation of the counter weights 6a, 6b. Therefore, all the inertia forces caused by the rotation of the telescope body 1 around the axis X can be canceled.

As for the rotation of the counter weights 6a, 6b, although not shown, they may also be arranged to rotate concentrically with the shaft 3 and independent of the telescope body 1. For example, a motor included in the rotator drive 10 can rotate the shaft 9 to which the counter weights 6a, 6b are fixed, or a disc containing the counter weights 6a, 6b circumferentially can be rotated by the principle of a linear motor. Control of such rotation of the counter weights 6a, 6b may be done easily by detecting the rotational speed of the telescope body 1 and controlling the rotation of the motor to correspond to the detected speed.

With respect to the rotation of the telescope body 1 around the axis Y, when the telescope body 1 together with the base 4 rotates in a direction β1 as shown in FIG. 1, for example, the counter weights 8a, 8b are rotated in a direction β2, which is opposite the direction β1, so that inertia force which is caused by the rotation in the direction β1 and acts on the installation base or on the space station side can be canceled. As the counter weights 8a, 8b are provided in the counter weight unit 7 in an arbitrary number of sets arranged circumferentially and opposite to each other, as mentioned above, when they are rotated in a direction opposite to that of the telescope body 1, inertia force acting in a direction to cancel the inertia force of the telescope body 1 can be obtained. Also, construction using the principle of a linear motor, as mentioned above, may be applied to the rotation of the counter weights 8a, 8b.

Thus, if the above described space telescope is installed on a space station, it may be operated with no inertia force being caused. Alternatively, if it is installed on land, attitude control thereof may be done easily.

Figure 2:
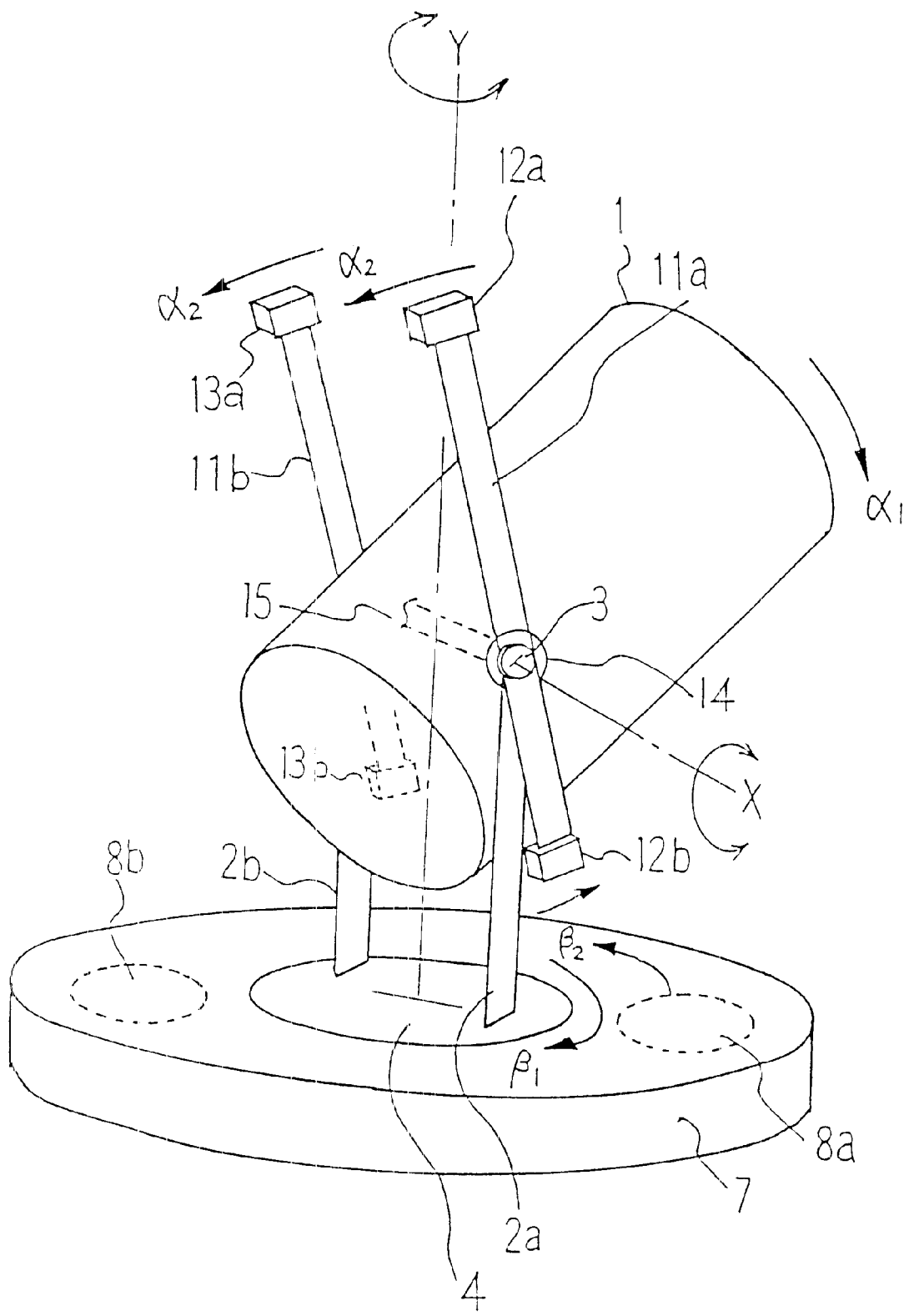
FIG. 2 is a perspective constructional view of a space telescope of a second embodiment according to the present invention.

FIG. 2 is a perspective constructional view of a space telescope of a second embodiment according to the present invention. In FIG. 2, parts or components designated by numerals 1 to 4, 7 and 8 are same as those shown in FIG. 1 with repeated description thereof being omitted and featured portions of the present second embodiment, which are parts or components designated by numerals 11 to 15, will be described below.

In FIG. 2, the telescope body 1 is supported by the shaft 3 rotatably therearound and an arm drive 14 for rotating arms independent of the telescope body 1 is connected to the shaft 3. A connecting shaft 15 has both ends fixed with central portions of arms 11a, 11b, and this connecting shaft 15 is connected to the arm drive 14. The arms 11a, 11b are constructed such that the arms 11a, 11b have both ends fitted with counter weights 12a, 12b and 13a, 13b, respectively, and are formed integrally with the connecting shaft 15 so as to be rotated by the arm drive 14 around the axis X. Other portions of the construction are the same as those of the first embodiment shown in FIG. 1.

In the telescope of the present second embodiment constructed as described above, when the telescope body 1 is rotated around the axis X, in direction α1 for example, the arm drive 14 rotates the connecting shaft 15 together with the arms 11a, 11b in direction α2, which is opposite the direction α1. The arm drive 14 can detect the rotational speed and rotational angle of the telescope body 1, and then the rotation arms 11a, 11b is controlled so as to correspond to the speed and angle so detected. Thus, inertia force caused by the rotation of the telescope body 1 around the axis X is canceled by the inertia force acting in the opposite direction, and no inertia force is transmitted to the installation side on which the telescope is installed, such as a space station. Also, the inertia force caused by the rotation of the telescope body 1 around the axis Y is canceled by the force caused by the opposite rotation of the counter weights 8a, 8b in the same manner as described with respect to the first embodiment shown in FIG. 1.

Figure 3:
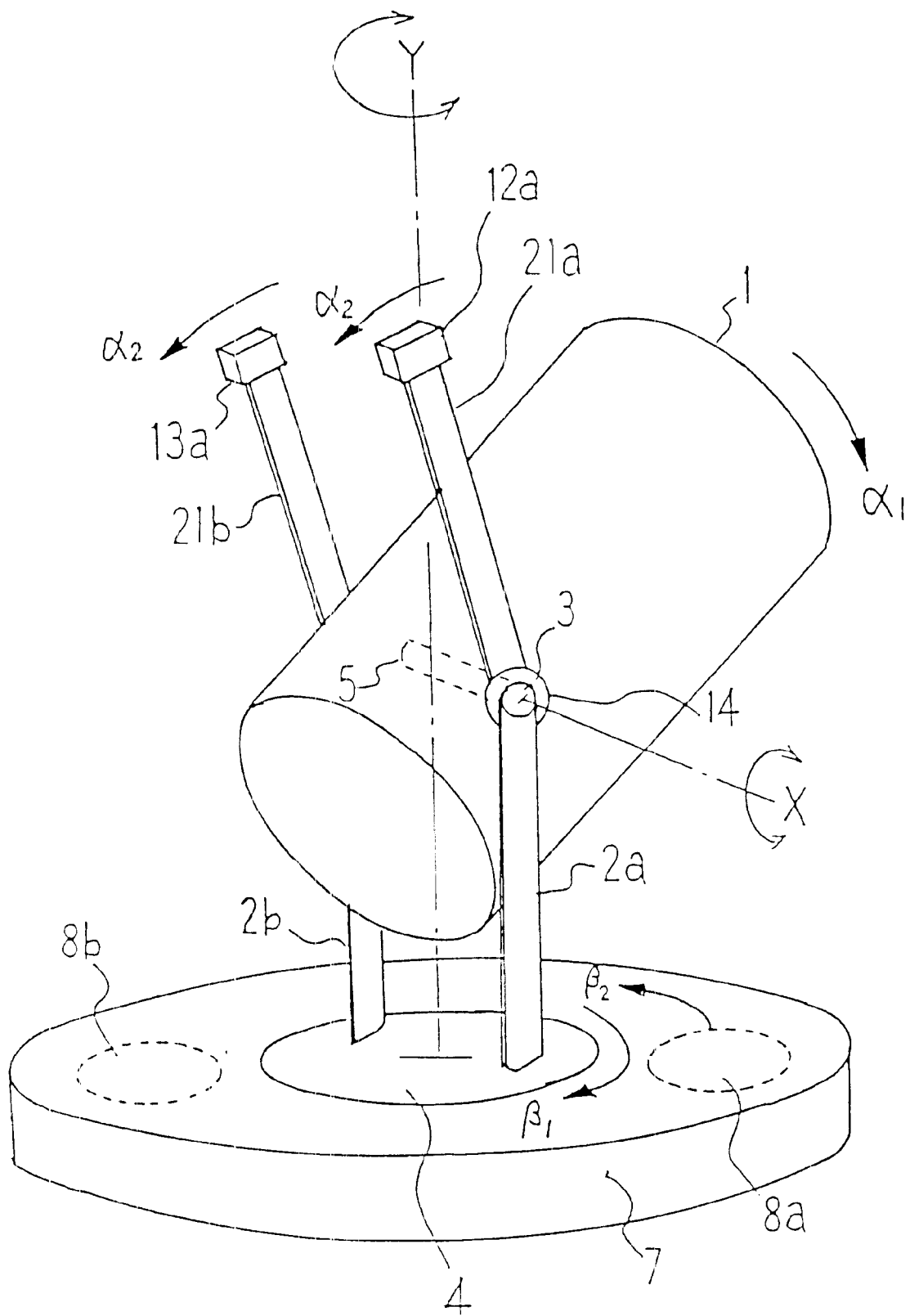
FIG. 3 is a perspective constructional view of a space telescope of a third embodiment according to the present invention.

FIG. 3 is a perspective constructional view of a space telescope of a third embodiment according to the present invention. In FIG. 3, lower portions of the arms 11a, 11b shown in FIG. 2 are cut off and the counter weights 12b, 13b of the lower ends are eliminated. Other portions are the same as those of the second embodiment of FIG. 2.

In the present third embodiment, arms 21a, 21b provided on both sides of the telescope body 1 are formed integrally with the connecting shaft 15 and are rotated by the arm drive 14 in a direction α2, which is opposite a direction α1 of the rotation of the telescope body 1. Thereby, the inertia force of the telescope body 1 around the axis X is canceled, like in the case of the second embodiment of FIG. 2. As compared with the construction of FIG. 2, the present third embodiment has an advantage that the number of pieces of the counter weights is reduced to thereby simplify the structure of the arms.

Figure 4A:
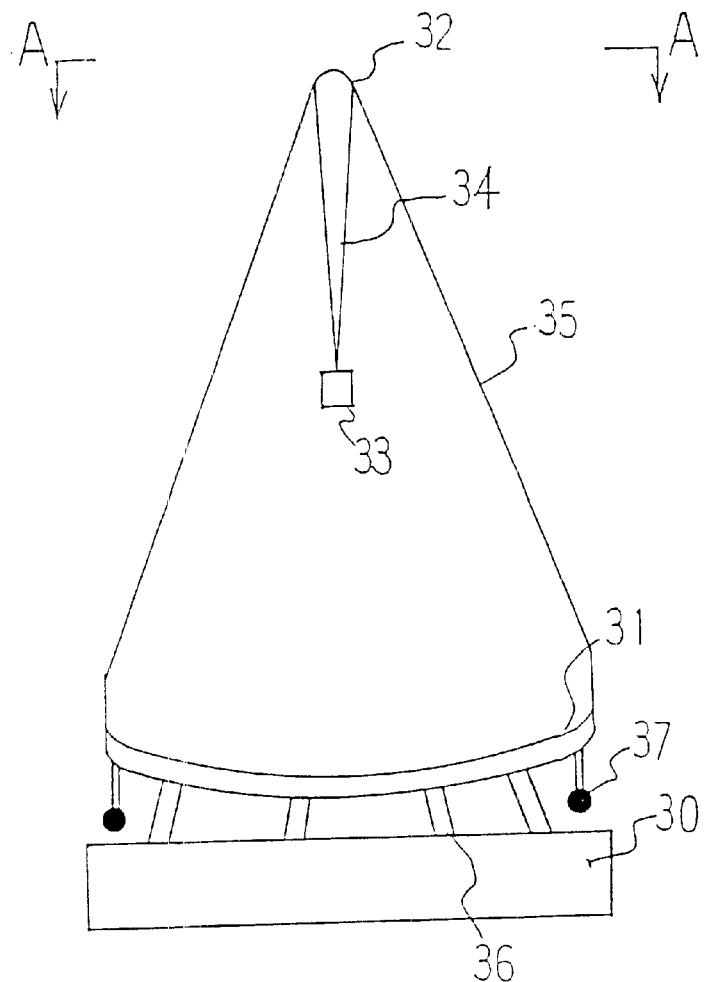
FIG. 4(a) is a side view and FIG. 4(b) is a view seen from arrows A—A of FIG. 4(a).
Figure 4B:
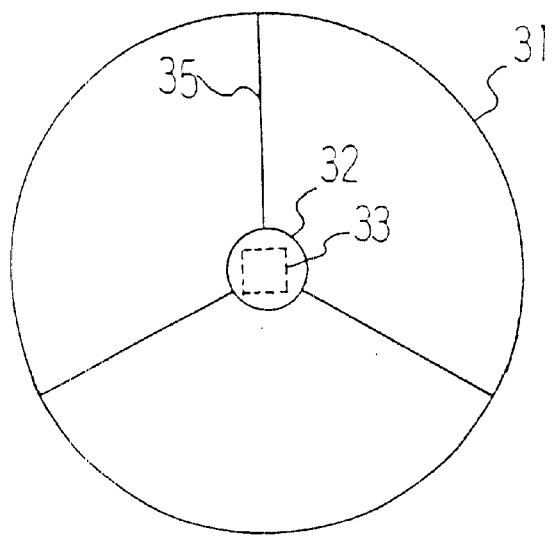

FIG. 4 is a constructional view of a space telescope of a fourth embodiment according to the present invention, wherein FIG. 4(a) is a side view and FIG. 4(b) is a view seen from arrows A—A of FIG. 4(a). In FIG. 4, numeral 30 designates a base. Above the base 30, there is a reflecting mirror 31 with a plurality of actuators 36 interposed between the base 30 and the reflecting mirror 31. Numeral 37 designates a counter weight, and a plurality of pieces of the counter weight 37 are suspended from a circumferential periphery of the reflecting mirror 31. Numeral 32 designates a condenser, which is supported by three sections of a condenser supporting member 35 extending up from the circumferential periphery of the reflecting mirror 31. Numeral 33 designates a camera supported by a camera supporting member 34 right below the condenser 32.

Figure 5A:
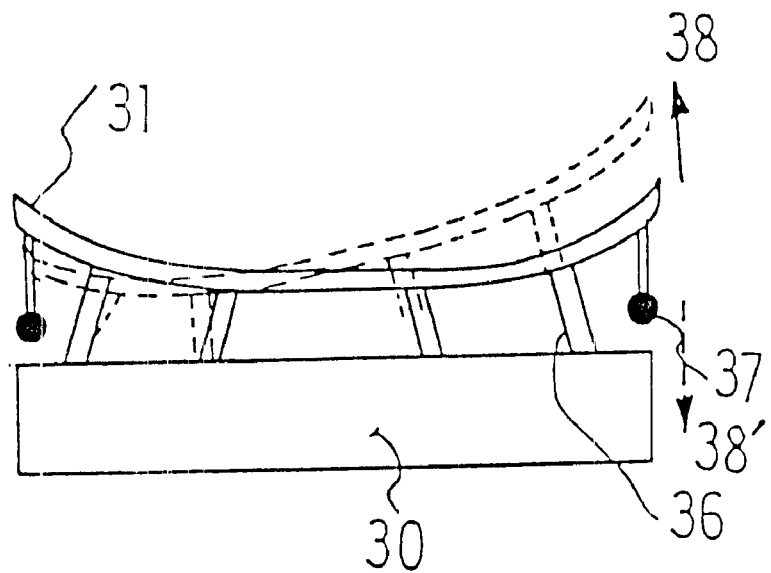
FIG. 5(a) is a side view and FIG. 5(b) is a plan view.
Figure 5B:
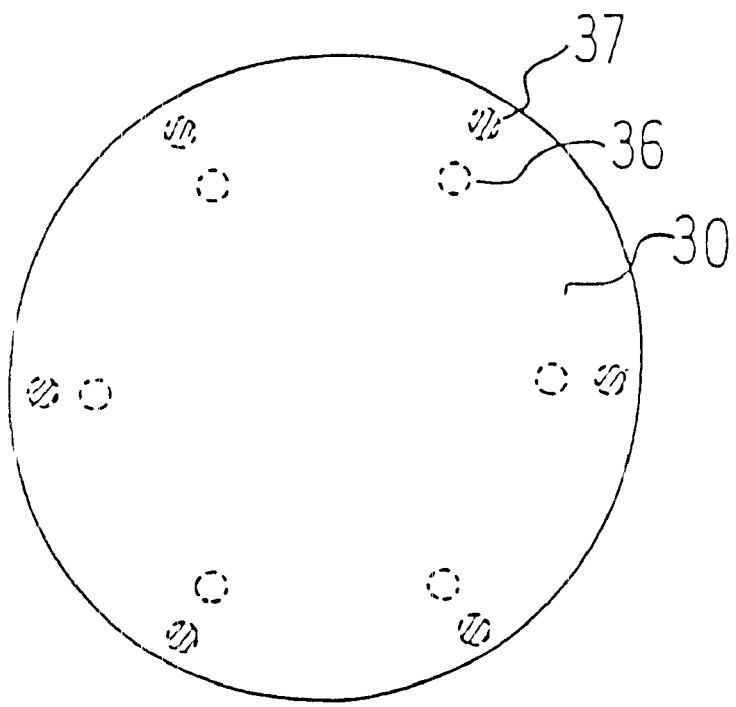

FIG. 5 is a detailed view showing the portion of the reflecting mirror 31, the actuators 36 and the counter weights 37 of the fourth embodiment of FIG. 4, wherein FIG. 5(a) is a side view and FIG. 5(b) is a plan view. The plurality of actuators 36 are arranged on a circumferential peripheral portion of the base 30, so that the reflecting mirror 31 may be moved by drive of the actuators 36 in a given direction for tracking stars and the like. The counter weights 37 are constructed to be driven to move up and down. When a peripheral portion of the reflecting mirror 31 is moved up and down a plurality of counter weight moving purpose linear motor coils 124. It is to be noted that the arrangements of the counter weight linear motor stationary side coils 123 and the counter weight moving purpose linear motor coils 124 on the bottom surface of the counter weight moving space 122 are substantially the same as those of the linear motor stationary side coils 112 and the moving purpose linear motor coils 110 on the concave upper surface 121 of the base stand 120 and illustration thereof is omitted.

Figure 11:
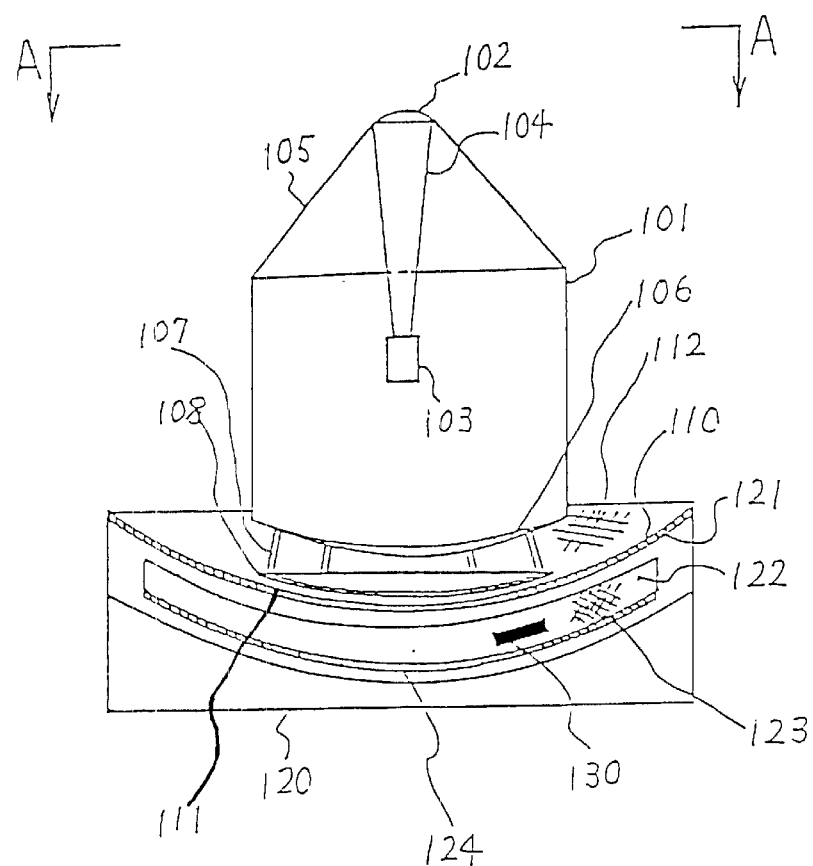
FIG. 11 is a cross sectional view of an example where an equipment movement control device of a sixth embodiment according to the present invention is applied to a telescope.
Figure 12:
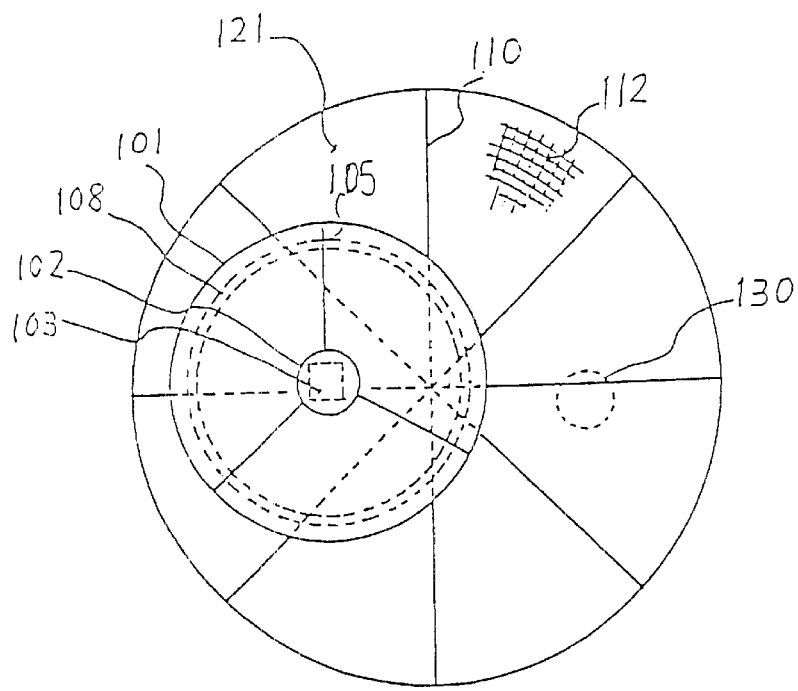
FIG. 12 is a view seen from arrows A—A of FIG. 11.

FIG. 12 is a view seen from arrows A—A of FIG. 11. On the concave upper surface 121 of the base stand 120, the linear motor stationary side coils 112 are arranged in a mesh state and the moving purpose linear motor coils 110 are arranged along the radial directions extending from the center of the concave upper surface 121. In the example illustrated, there are eight radial directions and if there are more than eight directions, a finer control will be possible. The telescope body 101, as illustrated, is biased toward the left hand side from the center in FIG. 12 and, in this state, the reflecting mirror 106, the condenser 102 and the camera 103 are integrally moved so as to be directed to the space to be observed. At this time, the counter weight 130 is biased opposite to the telescope body 101, that is, toward the right hand side in the figure, so that the inertia force caused by the movement of the telescope body 101 is canceled.

Figure 13:
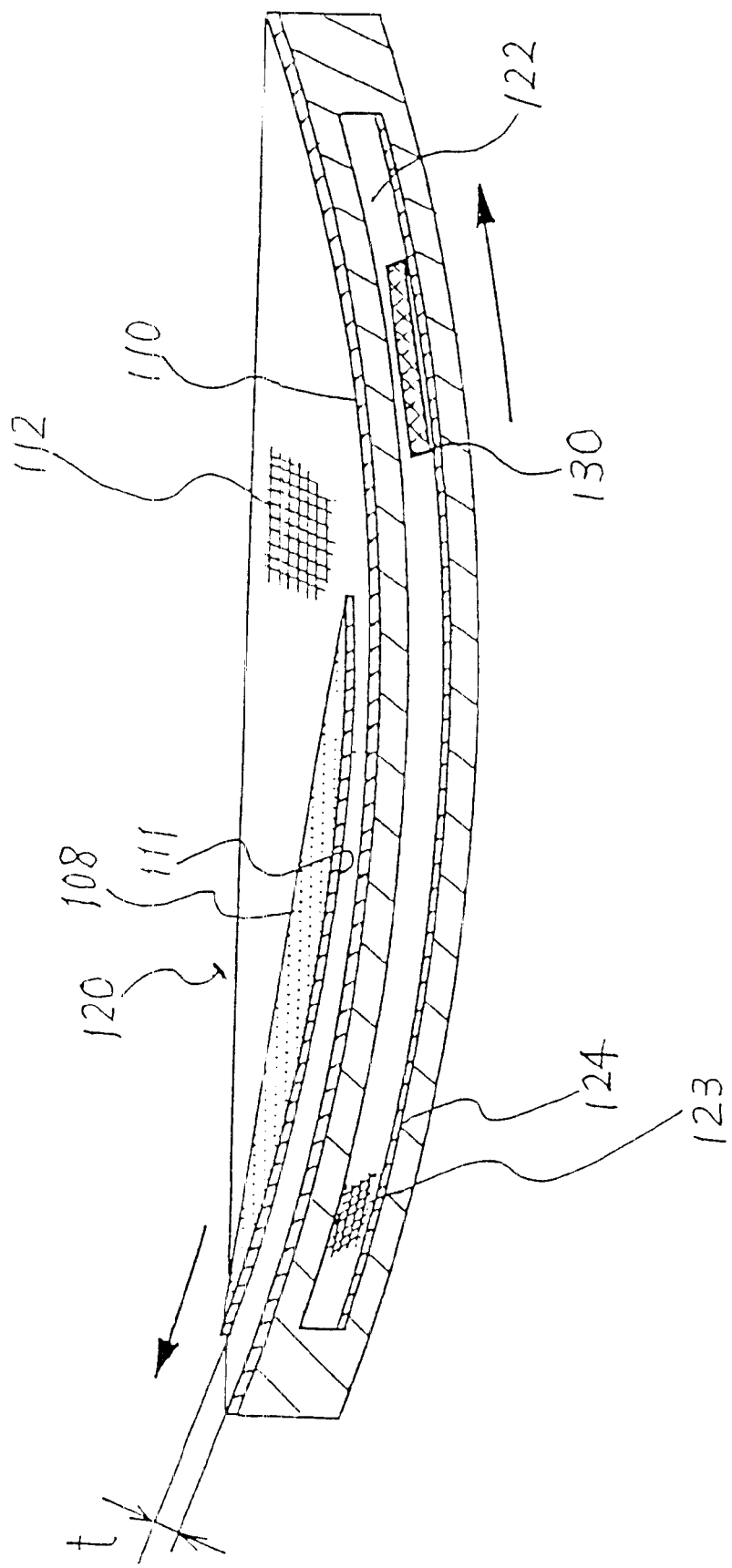
FIG. 13 is a detailed cross sectional view of a base stand of the sixth embodiment of FIG. 11.
Figure 14A:
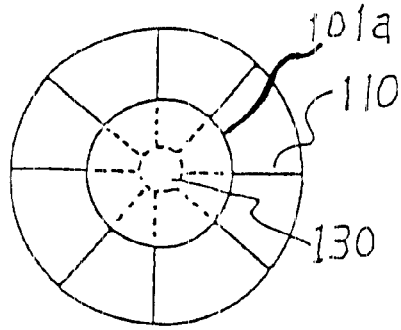
FIG. 14(a) shows a state where the telescope is in a central position and FIGS. 14(b) to (e) show states where the telescope is biased to various positions.
Figure 14D:
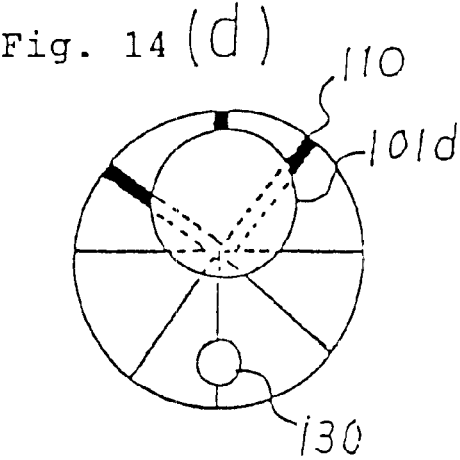
Figure 14B:
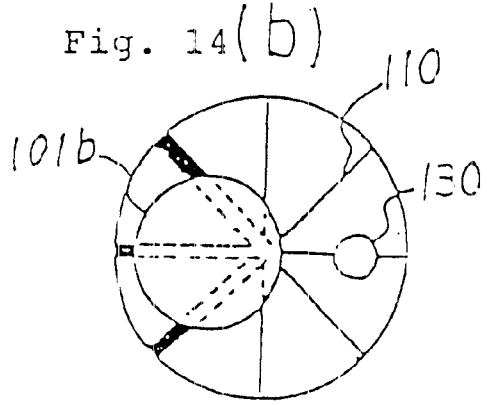
Figure 14E:
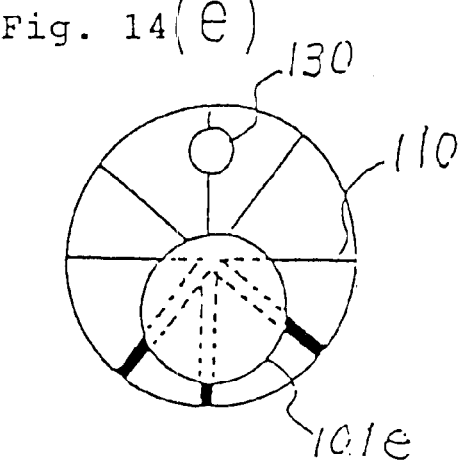
Figure 14C:
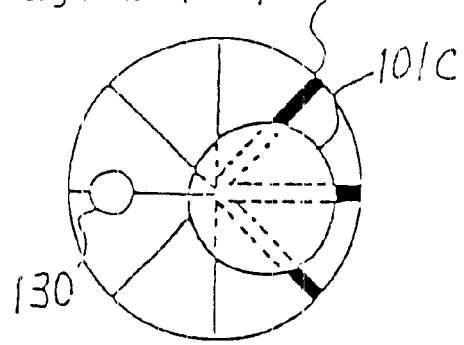

FIG. 13 is a detailed cross sectional view of a base stand portion of FIG. 11. The telescope body basement 108 is magnetically levitated by the repulsive force between the magnetic substance 111 and the linear motor stationary side coils 112 with a gap t being maintained therebetween, and is biased to the left hand side by the action of the moving purpose linear motor coils 110. On the other hand, the counter weight 130 is likewise magnetically levitated in the counter weight moving space 122 by the repulsive force with the counter weight linear motor stationary side coils 123, and is biased to the right hand side, which is opposite to the movement of the telescope body basement 108, by the action of the counter weight moving purpose linear motor coils 124. All of the mentioned movements of the telescope body basement 108 and the counter weight 130 are done synchronously so that the inertia force generated by movement of the telescope body can be canceled. 39 is moved opposite to the movement of the reflecting mirror 31, that is, downwardly as shown by numeral 38', and the inertia force generated is canceled.

Figure 8:
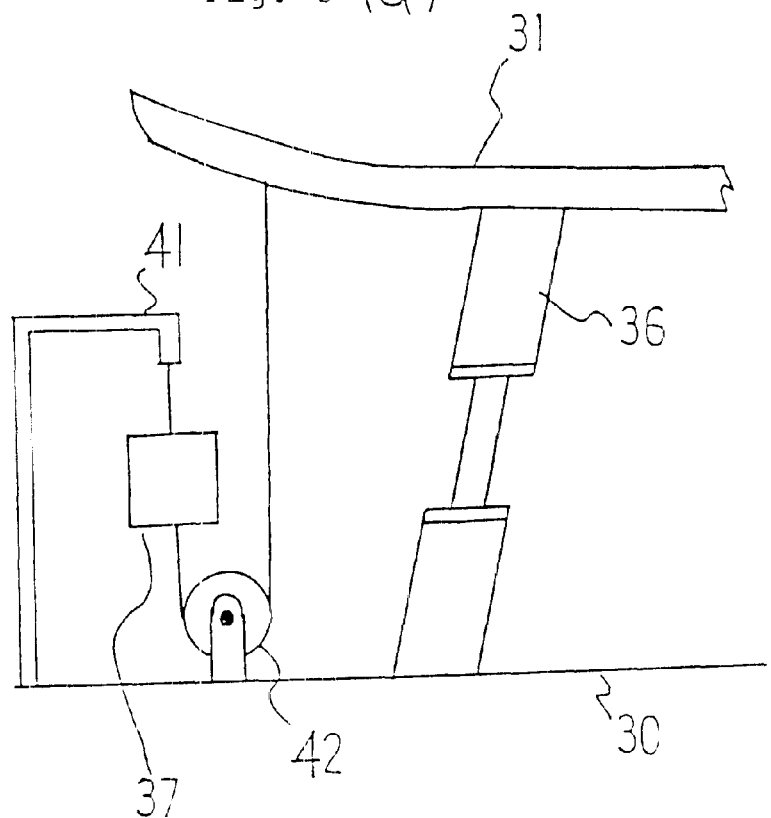
Figure 8:
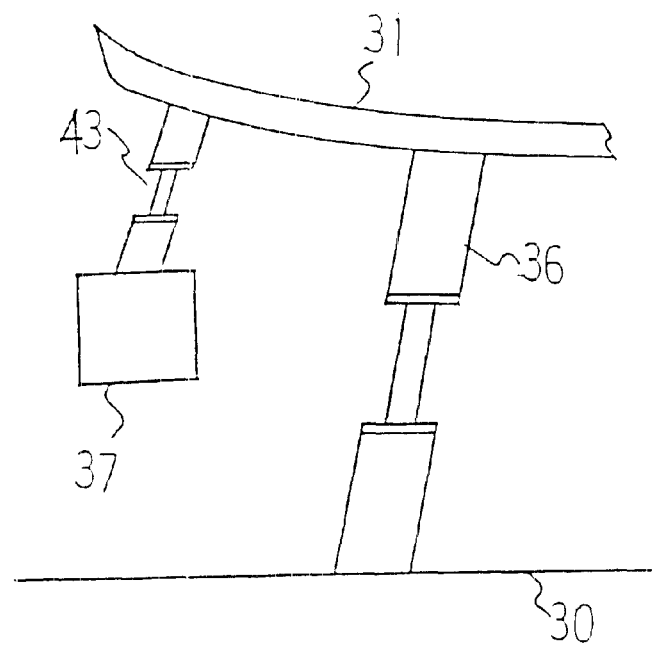

FIG. 8 is an explanatory view of the operation of the counter weight 37 of the fourth embodiment, wherein FIG. 8(a) is an example using a pulley and FIG. 8(b) is an example using an actuator. In FIG. 8(a), the counter weight 37 is suspended from a support member 41 and is connected to the reflecting mirror 31 via a pulley 42. By this construction, when the reflecting mirror 31 is moved upwardly by the actuator 36, the counter weight 37 is thereby pulled via the pulley 42, so that the mass of the counter weight 37 creates a movement of inertia which is reverse to that of the reflecting mirror 31 and the inertia force generated by movement of the mirror 31 is canceled. In FIG. 8(b), the counter weight 37 is fitted to the reflecting mirror 31 via an actuator 43. When the reflecting mirror 31 is moved up and down by the actuator 36, the actuator 43 elongates or contracts so as to move the counter weight 37 opposite to the movement of the reflecting mirror 31 so that the inertia force generated is canceled.

Figure 6:
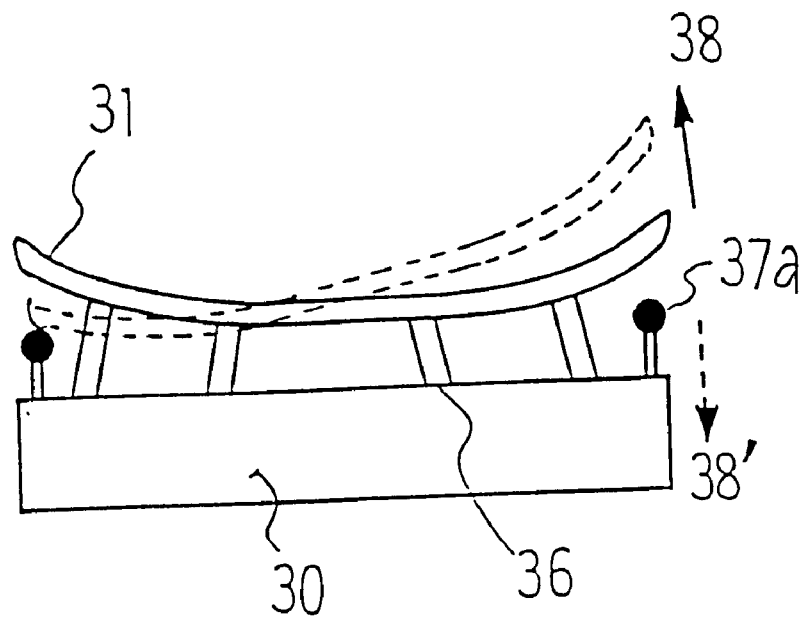
Figure 6:
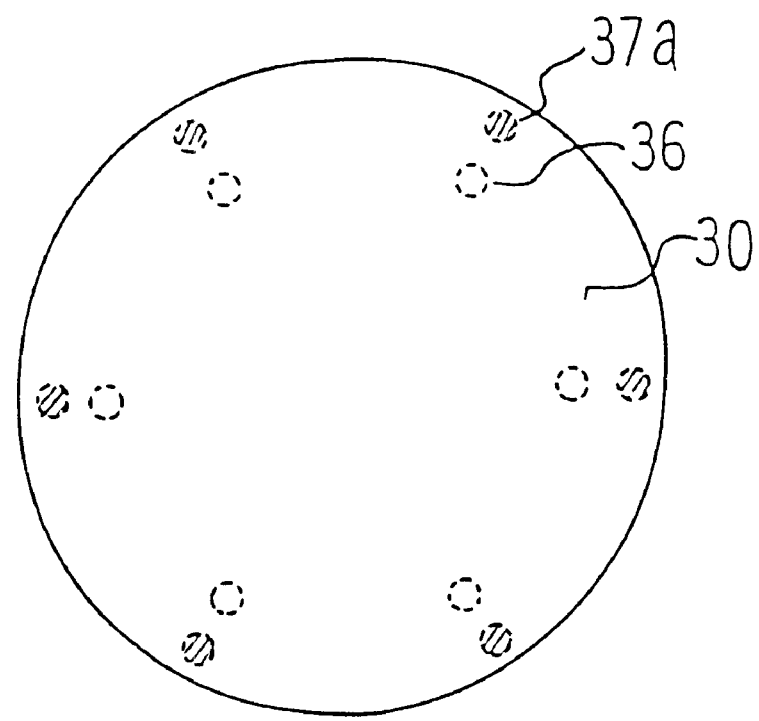
Figure 9:
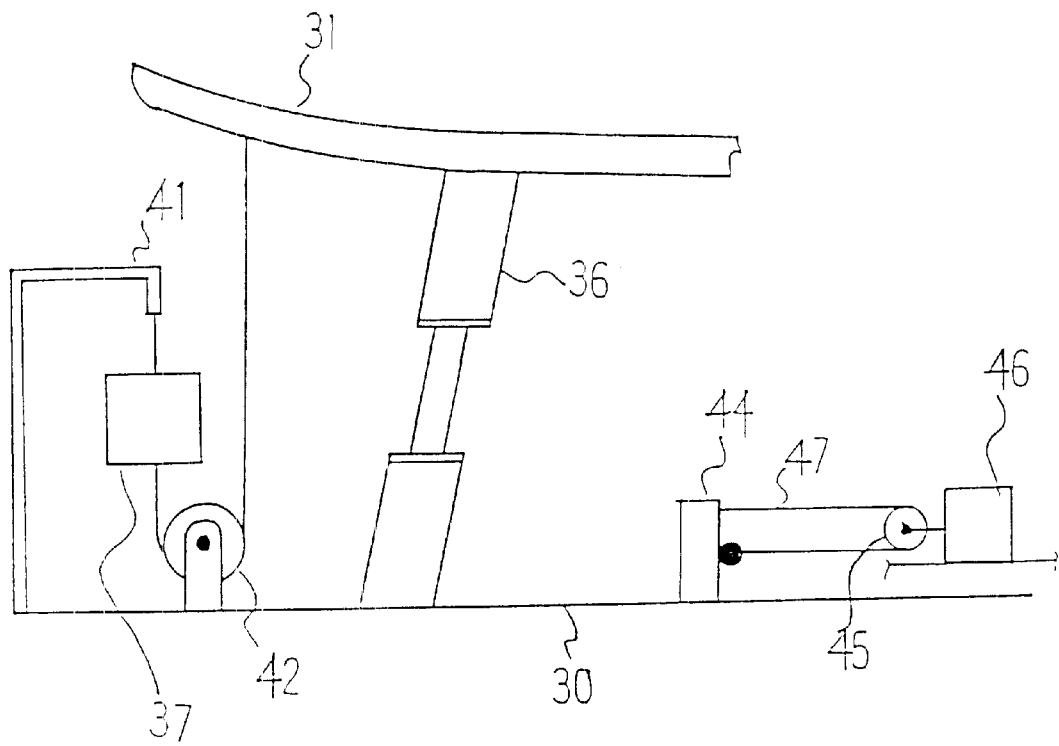
Figure 9:
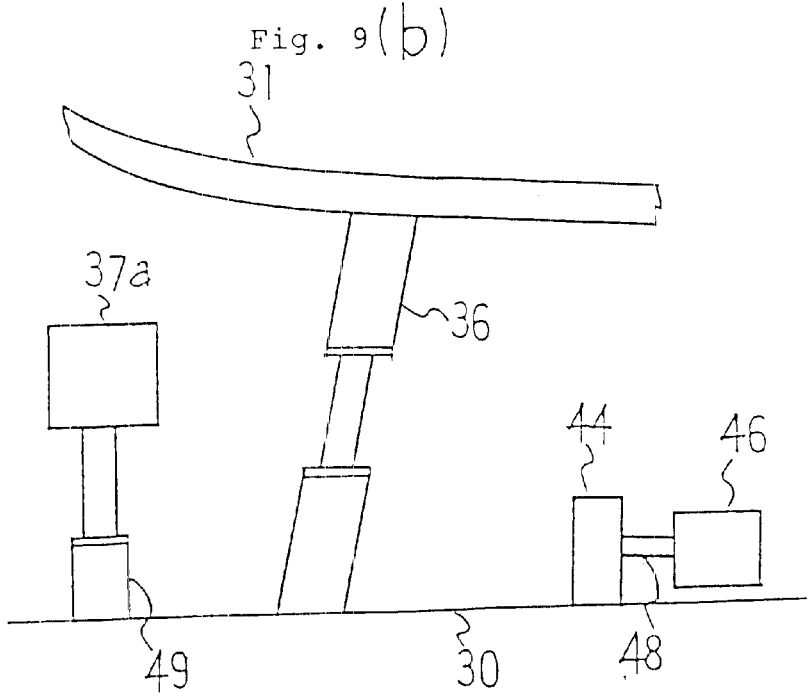

FIG. 9 is an explanatory view of application examples of the fourth embodiment comprising a horizontal component counter weight, wherein FIG. 9(a) is a side view of an example based on the construction of FIG. 8(a) and FIG. 9(b) is a side view of an example based on the construction of FIG. 6.

In FIG. 9(a), a supporting member 44 is fitted to the base 30 and a rope or chain 47 is fixed to the supporting member 44 so as to pull a horizontal component counter weight 46 via a supporting roller 45 to which the horizontal component counter weight 46 is connected. The horizontal component counter weight 46 is arranged in plural pieces to act in given directions including X and Y directions or intermediate directions thereof in the horizontal plane. Thus, when the base 30 is moved, tension by the counter weights 46 is applied to the supporting member 44 to act in a direction opposite to that of the force acting on the base 30 in the horizontal plane, and the inertia force generated on the base 30 in the horizontal plane is canceled.

In FIG. 9(b), the horizontal component counter weight 46 is fitted to the supporting member 44 via an actuator 48 so that the inertia force of the horizontal component may be canceled. It is to be noted that the counter weight 37a of FIG. 6 is fitted to the base 30 via an actuator 49 in the embodiment of FIG. 9(b).

Thus, in the examples of FIG. 9, the inertia force generated by the movement of the integral structure of the reflecting mirror 31, the condenser 32 and the camera 33 is canceled by the counter weight 37a of FIG. 6 or the counter weight 37 of FIG. 8(a). In addition to that, the inertia force acting on the base 30 in the horizontal direction is also canceled by the horizontal component counter weight 46. Hence, the inertia force generated in the space telescope can be further offset so as to be effectively canceled.

Figure 10A:
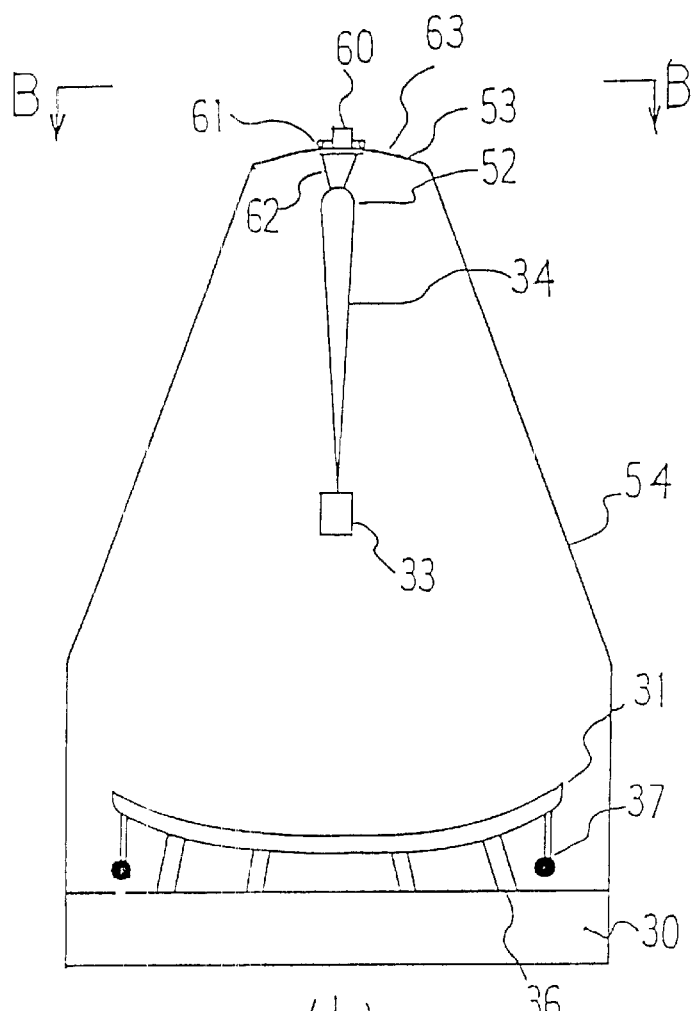
FIG. 10(a) is a side view and FIG. 10(b) is a view seen from arrows B—B of FIG. 10(a).
Figure 10B:
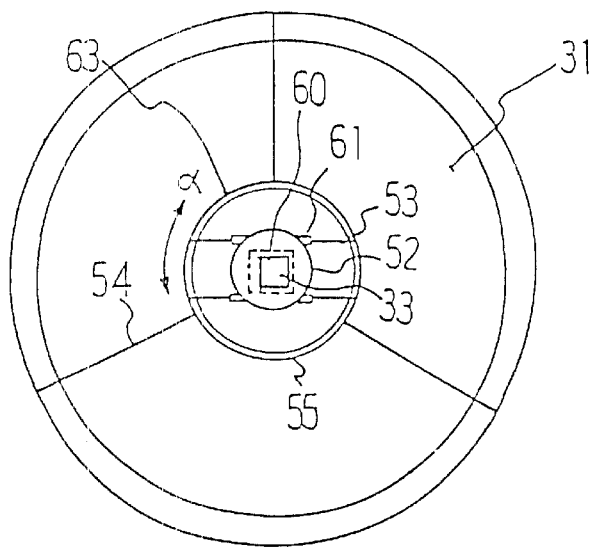

FIG. 10 is a constructional view of a space telescope of a fifth embodiment according to the present invention, wherein FIG. 10(a) is a side view and FIG. 10(b) is a view seen from arrows B—B of FIG. 10(a). In FIG. 10, the portions shown by numerals 30 (base), 31 (reflecting mirror), 36 (actuator) and 37 (counter weight) have the same structure as that of the fourth embodiment shown in FIG. 4 and when the reflecting mirror 31 is moved, the inertia force caused thereby is canceled as described with respect to FIG. 4.

In the present fifth embodiment, in addition to the functions of the fourth embodiment, the condenser is designed to be movable. That is, numeral 52 designates a movable condenser, which is movable on a rail 53, or on a movable condenser support 63 in place of the rail 53. The movable condenser 52 is supported by a movable condenser supporting member 62. The movable condenser supporting member 62 is fitted with a wheel 61 and a motor 60 so that the motor 60 rotates the wheel 61 to move the movable condenser 52 on the rail 53. If the movable condenser 52 is supported by the movable condenser support 63, a plane type linear motor (not shown) is provided on the movable condenser support 63 to move the movable condenser 52 slidably on the movable condenser support 63.

The rail 53 is made of a pair of elements to be fitted to a rail supporting member 55. The rail supporting member 55 is supported on the base 30 by three supporting members 54. The movable condenser 52 is fitted with a camera supporting member 34, and a camera 33 is fitted to a lower end of the camera supporting member 34. Thus, the movable condenser 52 and the camera 33 together with the camera supporting member 34 are supported integrally by the movable condenser supporting member 62. While the fourth embodiment shown in FIG. 4 is constructed such that the reflecting mirror 31 and the condenser 32 are moved integrally, the present fifth embodiment is constructed so that the reflecting mirror 31 and a unit including the condenser 52 and the camera 33 are moved independently of each other. Hence, either of them may be moved for tracking stars and the like, and the point therefor is that optical axes of both of them are to finally match with each other.

In the fifth embodiment mentioned above, when the movable condenser 52 is to be moved, the motor 60 is driven to rotate the wheel 61 on the rail 53 so that the movable condenser supporting member 62 together with the movable condenser 52 and the camera 33 are moved so as to track stars and the like. If the reflecting mirror 31 is to be moved, it is possible to move it by driving the actuators 36. But, in this case, as the reflecting mirror 31 is large as compared with the condenser 52 to cause a larger inertia force, this inertia force is to be canceled by the counter weights 37, like in the fourth embodiment. It is to be noted that in case the rail supporting member 55 and the rail 53 are used with no linear motor being used, the rail supporting member 55 together with the rail 53 is rotated in the horizontal plane, like rotation ?? in FIG. 10(*b*) and thereby the movable condenser 52 is made operable at any given position needed.

FIG. 11 is a cross sectional view of an example where an equipment movement control device of a sixth embodiment according to the present invention is applied to a telescope. In FIG. 11, the telescope comprises a telescope body 101 on a moving side and a base stand 120 on a stationary side, and the telescope is arranged so that the telescope body 101 is movable freely on an upper surface of the base stand 120.

That is, in FIG. 11, numeral 101 designates the telescope body and numeral 102 designates a condenser, which is supported in an upper central portion of the telescope body 101 by a condenser supporting member 105. Numeral 103 designates a camera, which is supported right below the condenser 102 by a camera supporting member 104 fitted to a periphery of the condenser 102. Numeral 106 designates a reflecting mirror, which reflects light rays coming from space and to converge the rays onto the condenser 102 provided above the reflecting mirror 106. Numeral 107 designates a plurality of telescope body supporting members, which are fixed to a telescope body base 108 to support a bottom surface of the telescope body 101.

The telescope body base 108 constitutes a bottom portion of the telescope body 101 and has a downwardly convex and smoothly curved bottom surface. The telescope body base 108 has its bottom surface attached with a magnetic substance, such as a permanent magnet, so that the telescope body 101 may be magnetically levitated movably on a concave upper surface 121 of the base stand 120, as described later. The concave upper surface 121 of the base stand 120 is made in a smoothly curved complementary form to maintain a predetermined small gap between itself and the convex bottom surface of the telescope body basement 108. The base stand 120 has a plurality of linear motor stationary side coils 112 attached to an entire portion of the concave upper surface 121 of the base stand 120 so that the telescope body base 108 may be levitated movably on the concave upper surface 121 with the predetermined small gap being maintained therefrom.

Further, on the concave upper surface 121 of the base stand 120, there are attached a plurality of moving purpose linear motor coils 110 along radial directions extending from a center of the concave upper surface 121 so that movement of the telescope body base 108 to a given position on the concave upper surface 121 may be controlled. Also, in the base stand 120 below the concave upper surface 121, there is provided a counter weight moving space 122, which has a predetermined height and which is formed in a shape complementary to the concave upper surface 121. A counter weight 130, having its lower surface made of a magnetic substance, is placed movably in the counter weight moving space 122. The counter weight moving space 122 has its bottom surface attached to a plurality of counter weight linear motor stationary side coils 123 and by the actuators 36, the counter weights 37 of that portion are driven to move up and down opposite to the movement of the reflecting mirror 31, so that inertia force caused by the movement of the structural portions of the reflecting mirror 31 and of the condenser 32 and the camera 33 connected to the reflecting mirror 31 may be canceled. In the example shown in FIG. 5, when the right hand side of the reflecting mirror 31 is moved upwardly as shown by numeral 38, the counter weight 37 of that portion is moved downwardly as shown by numeral 38'.

In the present fourth embodiment as described above, the reflecting mirror 31, the condenser 32 and the camera 33 together with the condenser supporting member 35 and the camera supporting member 34 are supported integrally by the actuators 36 for tracking stars and the like, and their inertia force is canceled by the counter weights 37. Therefore, the microgravity ($\mu$-G) environment of the space station on which the telescope is installed is prevented from being damaged.

FIG. 6 is a view showing one variation of the counterweights 37 of the fourth embodiment of FIG. 4, wherein FIG. 6(*a*) is a side view and FIG. 6(*b*) is a plan view. In this example, a plurality of counter weights 37*a*, each of which having the same structure as that of the counter weight 37 shown in FIG. 5, extend from the circumferential peripheral portion of the base 30, and the other portions are the same as those of the fourth embodiment shown in FIG. 5. In FIG. 6, when a portion of the reflecting mirror 31 is moved upwardly as shown by numeral 38, the counter weights 37*a* of that portion are moved downwardly as shown by numeral 38' and thereby the inertia force generated is canceled.

Figure 7:
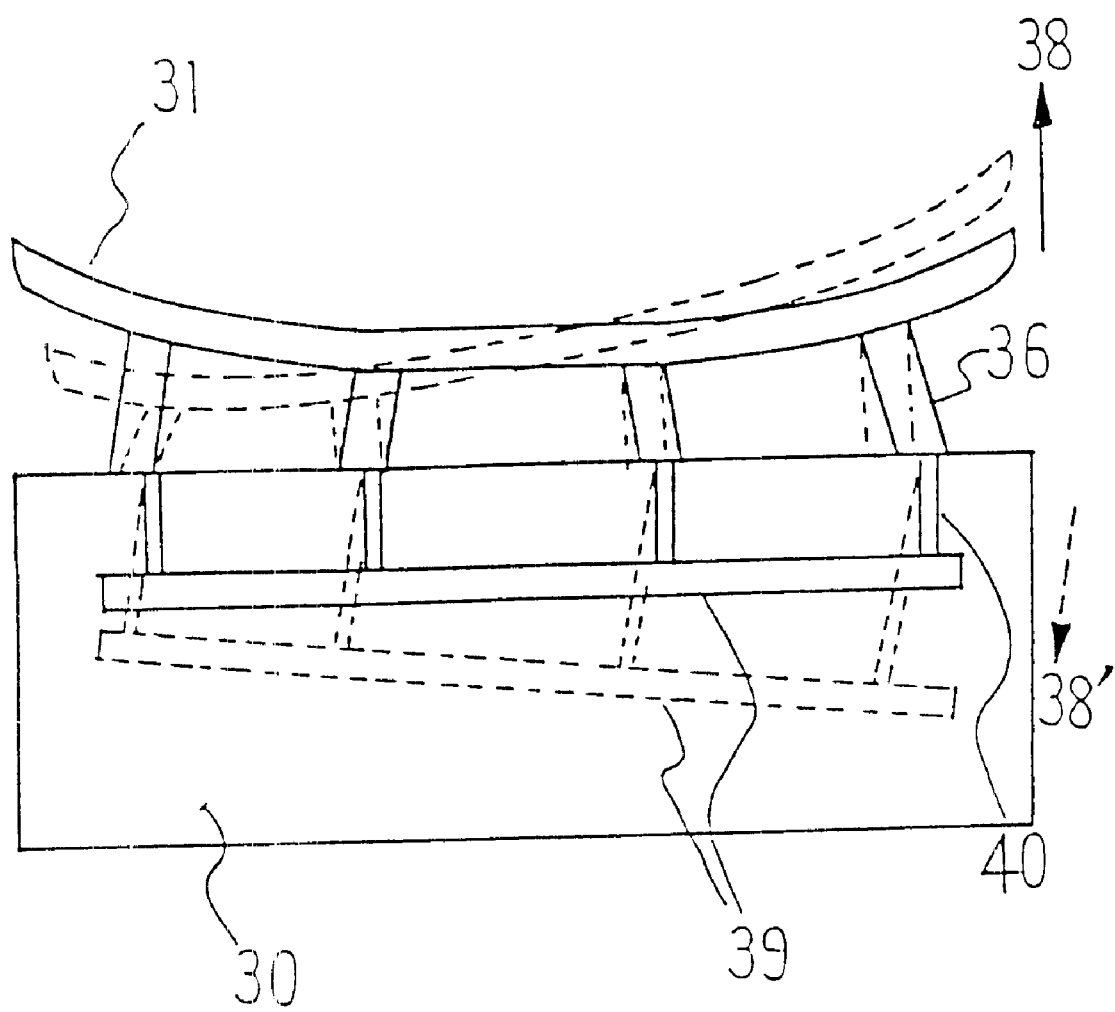
FIG. 7 is a side view showing another variation of the counter weight of the telescope of FIG. 4.

FIG. 7 is a side view showing another variation of the counter weights 37 of FIG. 5. In the present example, a counter weight 39 is provided within the base 30, and a plurality of counter weight actuators 40 are interposed between an upper wall of the base 30 and the counter weight 39. When the right hand side of the reflecting mirror 31 is moved upward as shown by numeral 38, the counter weight actuators 40 of that portion are driven at the same time to elongate their strokes with a drive force stronger than that of the other counter weight actuators 40, so that the counter weight FIG. 14(*a*) to FIG. 14(*e*) show functions of the telescope body 101 and the counter weight 130 of the telescope of the sixth embodiment of FIG. 11. The functions will be described referring to FIG. 14 as well as FIGS. 11 and 12. Firstly, in FIG. 14(*a*), the telescope body 101*a* and the counter weight 130 are both in the initial state where they are located at the center of the eight pieces of the moving purpose linear motor coils 110. In this state, when the linear motor stationary side coils 112 attached to the entire concave upper surface 121 are excited, the telescope body 101 is levitated by the repulsive force between the magnetic substance 111 attached to the bottom surface of the telescope body base 108 and the linear motor stationary side coils 112. In this case, it is to be noted that the linear motor stationary side coils 112 are excited to have the same polarity as the magnetic substance 111 so that the repulsive force may be generated between them.

In FIG. 14(*b*), in the state where the telescope body 101 is so levitated, if the portion of the moving purpose linear motor coils 110, shown by bold solid lines in the figure, out of the eight pieces thereof is excited, the telescope body 101*b* is moved to the left hand side, as illustrated, by the attractive force between that portion of the moving purpose linear motor coils 110 and the magnetic substance 111 attached to the bottom surface of the telescope body base 108. In this case, the portion of the moving purpose linear motor coils 110, shown by fine lines in the figure, is not excited and the moving purpose linear motor coils shown by the bold solid lines are excited to have such a polarity as to generate the attractive force with the magnetic substance 111 attached to the bottom surface of the telescope body base 108.

At this time, the counter weight 130 is likewise levitated by the counter weight linear motor stationary side coils 123 in the counter weight moving space 122 and is moved to the right hand side by the counter weight moving purpose linear motor coils 124. All the mentioned movements of the telescope body 101*b* and the counter weight 130 are done at the same time so that the inertia force caused by the movement of the telescope body 101*b* is canceled.

In FIG. 14(*c*), three moving purpose linear motor coils on the right hand side, shown by the bold solid lines, out of the eight pieces thereof are excited so that the telescope body 101*c* is moved to the right hand side and the counter weight 130 is moved to the opposite left hand side. Therefore, the inertia force caused by the movement of the telescope body 101*c* is canceled.

Also, in FIG. 14(*d*), three moving purpose linear motor coils on the upper side, shown by the bold solid lines, out of the eight pieces thereof are excited so that the telescope body 101*d* is moved upwardly and the counter weight 130 is moved downwardly in the opposite direction. Further, in FIG. 14(*e*), the telescope body 101*e* is moved downwardly by the same action and the counter weight is moved upwardly in the opposite direction, so that the inertia force generated is canceled.

As described above, the telescope body 101 can be moved to an arbitrary position to be directed to the object to be observed. Further, the telescope body 101 is moved along the concave upper surface 121 of the base stand 120, and the reflecting mirror 106, the condenser 102, and the camera 103 can be directed integrally in the desired direction. Once the position is decided, excitation of the linear motor stationary side coils 112 on the base stand 120 is released and the telescope body basement 108 at its bottom surface is set on the concave upper surface 121 of the base stand 120 to be fixed there.

Figure 15:
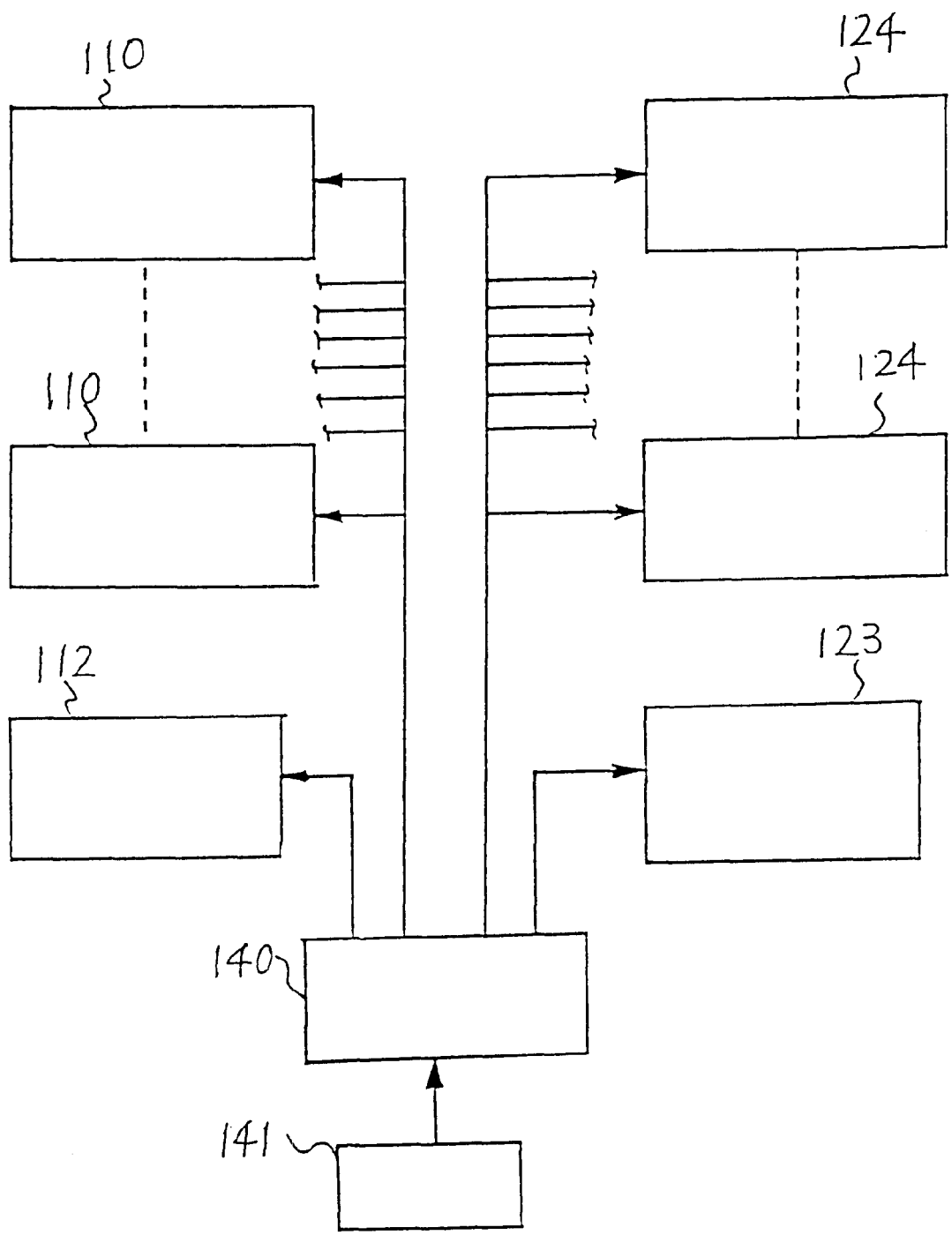
FIG. 15 is a control diagram of the telescope of the sixth embodiment of FIG. 11.

FIG. 15 is a control diagram of the telescope of the sixth embodiment of FIG. 11. When position data of two dimensions of X and Y coordinates of the telescope body 101 are given from a setting unit 141, a control unit 140 excites the linear motor stationary side coils 112 to thereby levitate the telescope body 101 from the base stand 120. Then, the control unit 140 selects moving purpose linear motor coils 110 of the position to which the telescope body 101 is to be moved and excites them to be moved. At the same time, the control unit 140 excites the counter weight linear motor stationary side coils 123 to levitate the counterweight 130 and also selects the counter weight moving purpose linear motor coils 124 at the position which is opposite and symmetrical to the position of the telescope body 101 and excites them to thereby move the counter weight 130 to the opposite direction. By so effecting the control, when the telescope body 101 comes to the position, excitation of the linear motor stationary side coils 112 is released upon signal from the setting unit 141, and the telescope body 101 is fixed on the base stand 120.

Figure 16:
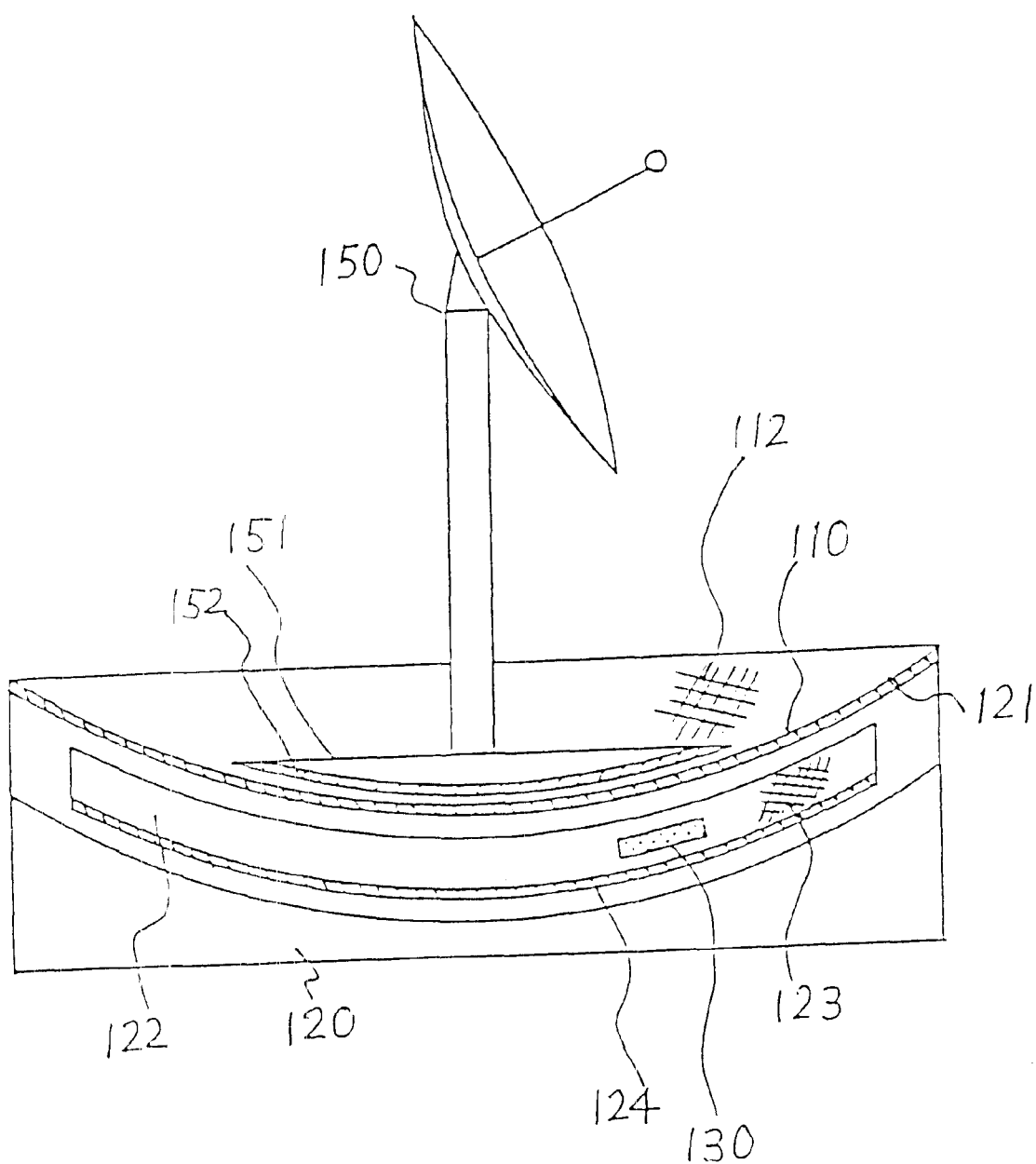
FIG. 16 is a cross sectional view showing an equipment movement control device of a seventh embodiment according to the present invention, wherein the equipment movement control device is applied to an antenna.

FIG. 16 is a cross sectional view of an example where an equipment movement control device of a seventh embodiment according to the present invention is applied to an antenna. In the seventh embodiment of FIG. 16, an antenna body 150 is used in place of the telescope, shown by reference numerals 101 to 107, of the sixth embodiment of FIG. 11. Construction of the base stand 120 on which the antenna body 150 is installed is the same as that shown in FIG. 13.

In FIG. 16, an antenna body base 151 of the antenna body 150 constitutes a bottom portion of the antenna body 150 and has a downwardly convex and smoothly curved bottom surface. The antenna body base 151 has its bottom surface attached to a magnetic substance 152, such as a permanent magnet, so that the antenna body 150 may be magnetically levitated movably on the concave upper surface 121 of the base stand 120.

That is, the base stand 120, having the same structure as shown in FIG. 13, has its concave upper surface 121 attached to a linear motor stationary side coils and thereby the antenna body 150 can be magnetically levitated movably on the concave upper surface 121 of the base stand 120 by the same principle as described with respect to the sixth embodiment. Because the functions thereof are the same as those described with respect to FIGS. 14 and 15, repeated description will be omitted. In the present seventh embodiment also, the antenna body 150 is magnetically levitated on the base stand 120 so that the antenna body 150 can be moved easily to a desired direction and position.

It is to be noted that although the examples where the telescope is placed on the base stand 120 in the sixth embodiment and the antenna is placed on the base stand 120 in the seventh embodiment have been described, the present invention is not limited thereto but may be applied to measuring devices, testing devices or the like that have directivity, other than the mentioned examples and in this case also, the same effect can be obtained.

Figure 17:
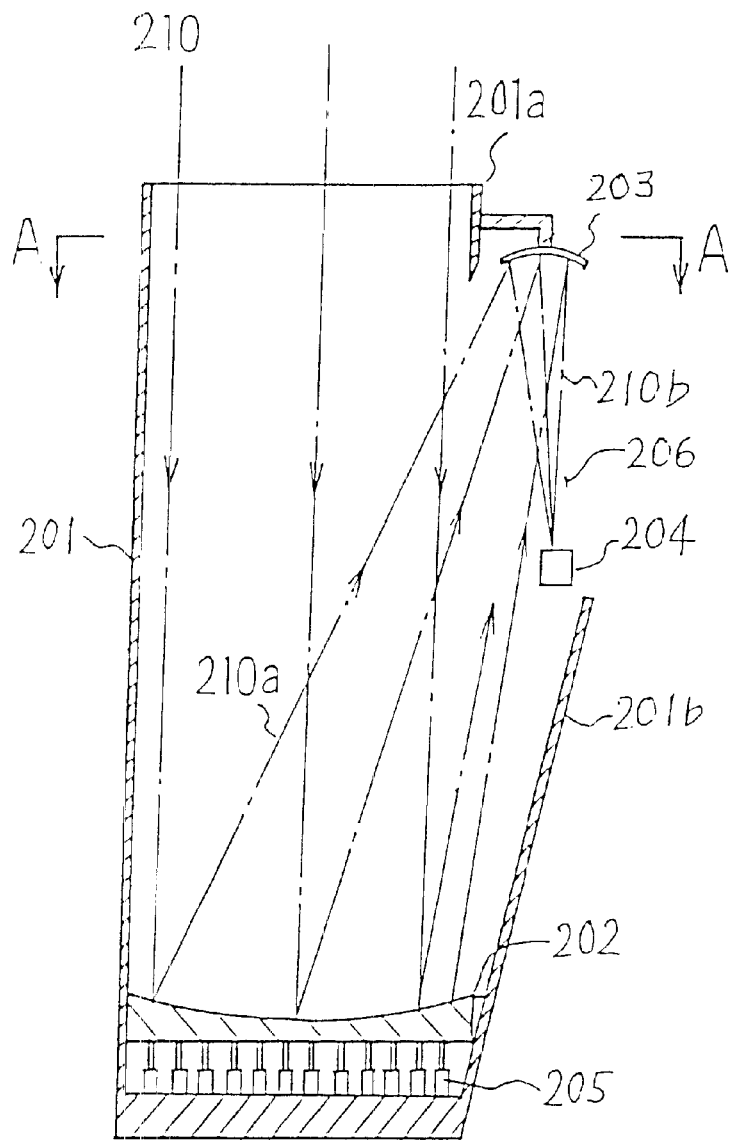
FIG. 17 is a cross sectional constructional view of an astronomical reflecting telescope of an eighth embodiment according to the present invention.
Figure 18:
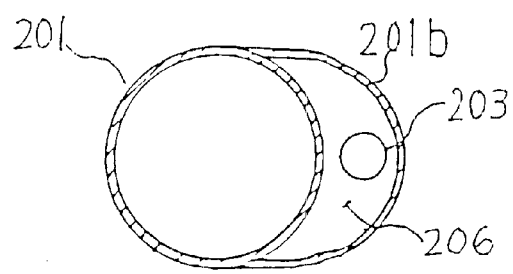
FIG. 18 is a cross sectional plan view taken on line A—A of FIG. 17.

An astronomical reflecting telescope of an eighth embodiment according to the present invention will be described with reference to FIGS. 17 and 18. In FIGS. 17 and 18, numeral 201 designates a telescope body, which has an upper portion 201a and a lower portion 201b wherein a transverse cross sectional area of the lower portion 201b is larger than that of the upper portion 201a, as shown in FIG. 18. That is, while a transverse cross section of the upper portion 201a is circular, the lower portion 201b has a circular cross sectional shape enlarged on one side, on the right hand side in FIG. 18, by an opening portion 206 which opens obliquely upwardly. A bottom portion of the telescope body 201 has a circular shape, like the upper portion 201a. It is to be noted that the opening portion 206 may be formed by cutting out a necessary area in an arbitrary shape.

Numeral 202 designates a concave mirror, which is arranged on the bottom portion of the telescope body 201. Numeral 203 designates a condenser, which is located outside of the opening portion 206 away from the central axis of the telescope body 201, at a position from which the concave mirror 202 at the bottom portion of the telescope body 201 is looked over through the opening portion 206. Numeral 204 designates a camera or an ocular, which is located near the opening portion 206 at a position of a convergent point of the light coming from the condenser 203. That is, the condenser 203 and the camera 204 are located in the area near the opening portion 206 away from the central axis of the telescope body 201.

Numeral 205 designates an actuator, which is arranged in a multiplicity of pieces between the bottom surface of the telescope body 201 and the bottom surface of the concave mirror 202. Thus, by driving the actuators 205 existing near the required position, the setting angle of the concave mirror 202 relative to the bottom surface of the telescope body 201 can be changed arbitrarily. Hence, according to the angle of the entering light 210, a reflecting light 210a is reflected toward the condenser 203 to be converged accurately.

In the present eighth embodiment constructed as described above, the light 210 from space enters the upper portion 201a of the telescope body 201 to be reflected by the concave mirror 202, like numeral 210a, and then to be converged by the condenser 203, like numeral 210b, and is then focused as an image by the camera 204 right below the condenser 203. The angle of the light 210a reflected by the concave mirror 202 is adjusted to be set so as to be converged on the condenser 203 by driving the actuators 205, as mentioned above. According to the present embodiment, the light 210 entering the telescope body 201 from above reaches the concave mirror 202 in its full quantity without being partially blocked on the way by the condenser 203, as in the prior art case, and an accurate image can be taken without reduction in the converging performance.

It is to be noted that a surface shape of the concave mirror 202 is set to such a shape as to minimize an optical path difference with the condenser 203, and a concave surface shape of the condenser 203 is set arbitrarily.

Figure 19:
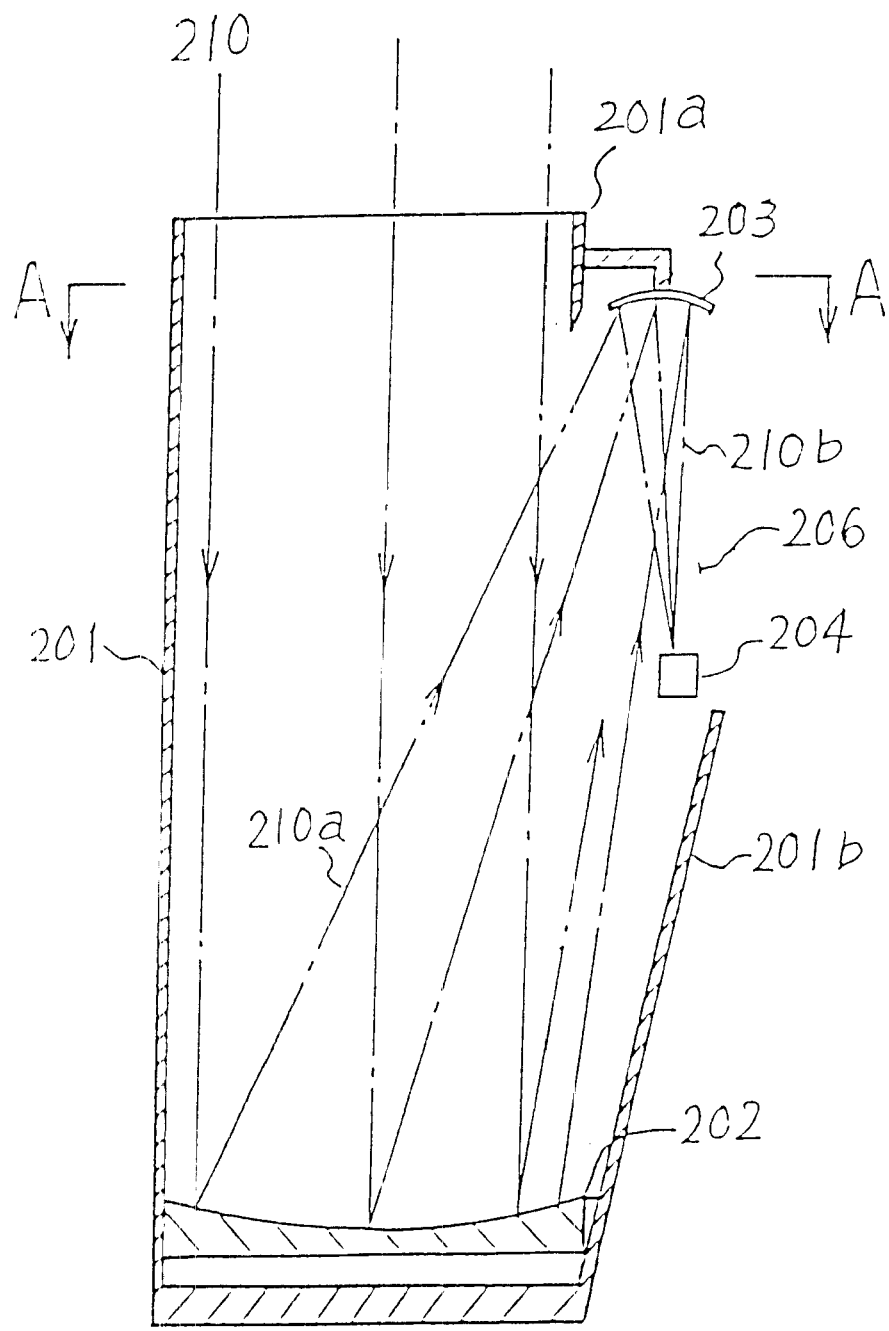
FIG. 19 is a cross sectional view of an astronomical reflecting telescope of a ninth embodiment according to the present invention.
Figure 20:
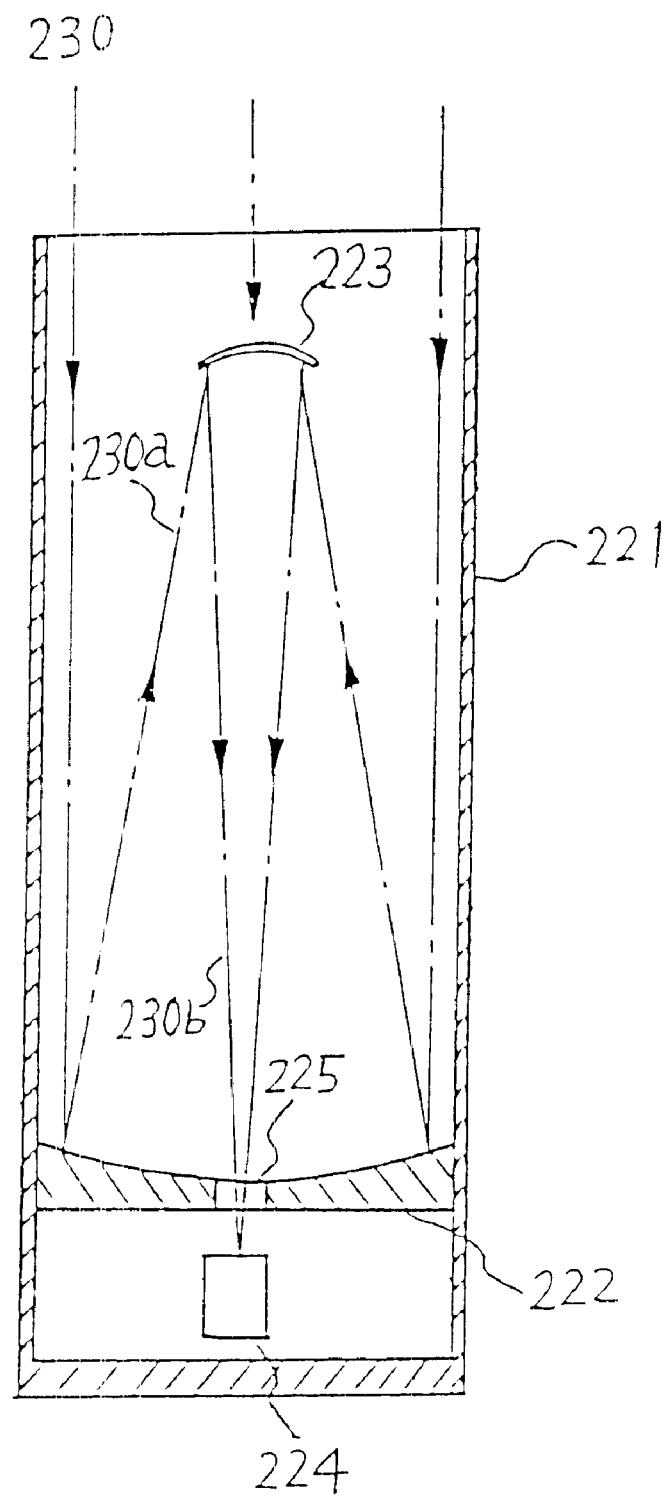
FIG. 20 is a cross sectional constructional view of a reflecting telescope in the prior art.

FIG. 19 is a cross sectional constructional view of an astronomical reflecting telescope of a ninth embodiment according to the present invention. In the present ninth embodiment, as compared with the eighth embodiment shown in FIG. 17, the actuators 205 are eliminated and construction of other portions are the same as those shown in FIG. 17.

Accordingly, in the ninth embodiment, the angle of the concave mirror 202 relative to the bottom surface of the telescope body 201 is set in advance so that the reflected light 210a may be converged on the condenser 203 when the telescope body 201 is correctly directed to the observation object. The concave mirror 202 has its bottom portion fixed to the bottom surface of the telescope body 201 so as to reflect the light with the angle so set. In the present ninth embodiment, the light 210 entering the upper portion 201a of the telescope body 201 is blocked by the condenser, differently from the prior art case, the converging performance of the telescope is not reduced, and the same effect as that in the eighth embodiment can be obtained.

It is to be noted that the reflecting telescope of the present invention is applicable to any usage including an astronomical observation telescope installed on land or mounted on a space craft that flies in the space for a space observation and, in this case also, the same effect can be obtained.

In the above, while the three kinds of embodiments according to the present invention have been described, combinations of two or more, as the case may be, of the mentioned embodiments may also be employed. For example, it is possible that the counter weights of the first embodiment can be used with the reflecting telescope of the third embodiment, and this is moved by the equipment movement control device of the second embodiment.

What is claimed is:

1. A telescope comprising:
   a telescope body including a reflecting mirror, a condenser, and one of a camera and an ocular, said telescope body being operable to move so as to be directed at an object to be observed;
   a counterweight unit connected to said telescope body and operable to move in a direction opposite to a direction of movement of said telescope body simultaneously as said telescope body moves so as to cancel an inertia force generated by the movement of said telescope body.

2. The telescope of claim 1, wherein said reflecting mirror, said condenser, and said one of said camera and said ocular are integrally interconnected so as to be movable as a unit to be directed at the object to be observed.

3. The telescope of claim 2, wherein said counterweight unit comprises a plurality of counterweights arranged so as to extend from a circumferential periphery of a bottom portion of said reflecting mirror, each of said counterweights being operable to move in a direction opposite to a direction of movement of said reflecting mirror simultaneously as said reflecting mirror moves.

4. The telescope of claim 3, wherein each of said counterweights is connected to said circumferential periphery of said bottom portion of said reflecting mirror by an actuator.

5. The telescope of claim 2, further comprising a base, said reflecting mirror of said telescope body being connected to said base, wherein said counterweight unit comprises a plurality of counterweights arranged so as to extend from a circumferential periphery of said base, each of said counterweights being operable to move in a direction opposite to a direction of movement of said reflecting mirror simultaneously as said reflecting mirror moves.

6. The telescope of claim 5, wherein each of said counterweights is connected to said circumferential periphery of said base by an actuator.

7. The telescope of claim 5, wherein said counterweight unit comprises a first counterweight unit, further comprising a second counterweight unit including a plurality of horizontally-aligned counterweights on an upper surface of said base.

8. The telescope of claim 2, further comprising a base, a bottom surface of said reflecting mirror being connected to said base, wherein said counterweight unit is arranged in said base and is operable to move in a direction opposite to a direction of movement of said reflecting mirror simultaneously as said reflecting mirror moves.

9. The telescope of claim 8, wherein said counterweight unit comprises a first counterweight unit, further comprising a second counterweight unit including a plurality of horizontally-aligned counterweights on an upper surface of said base.

10. The telescope of claim 8, further comprising:

a base, said telescope body being mounted on said base and being operable to upwardly-and-downwardly rotate and to axially rotate about an axis orthogonal to said base so as to be directed at the object to be observed, said counterweight unit comprising a first counterweight unit operable to upwardly-and-downwardly rotate in a direction opposite to a direction of upward-and-downward rotation of said telescope body simultaneously as said telescope body upwardly-and-downwardly rotates so as to cancel an inertia force generated by the upward-and-downward rotation of said telescope body; and a second counterweight unit operable to axially rotate in a direction opposite to a direction of axial rotation of said telescope body simultaneously as said telescope body axially rotates so as to cancel an inertia force generated by the axial rotation of said telescope body.

11. The telescope of claim 10, wherein said first counterweight unit comprises an arm operable to rotate about a centerpoint on said arm, and a counterweight attached to an end of said arm.

12. The telescope of claim 1, wherein said telescope body is operable to rotate about an X-axis so as to be directed at an object to be observed, said counterweight unit being operable to rotate about the X-axis in a direction opposite to a direction of rotation of said telescope body simultaneously as said telescope body rotates so as to cancel an inertia force generated by the rotation of said telescope body about the X-axis.

13. The telescope of claim 12, wherein said counterweight unit comprises a first counterweight unit, said telescope body being further operable to rotate about a Y-axis orthogonal to the X-axis so as to be directed at an object to be observed;

further comprising a second counterweight unit operable to rotate about the Y-axis in a direction opposite to a direction of rotation of said telescope body simultaneously as said telescope body rotates about the Y-axis so as to cancel an inertia force generated by the rotation of said telescope body about the Y-axis.

* * * * *